(12) United States Patent
Tang et al.

(10) Patent No.: US 8,988,789 B2
(45) Date of Patent: Mar. 24, 2015

(54) OPTICAL IMAGE SYSTEM

(71) Applicant: Largan Precision Co., Ltd., Taichung (TW)

(72) Inventors: Hsiang-Chi Tang, Taichung (TW); Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 197 days.

(21) Appl. No.: 13/652,486

(22) Filed: Oct. 16, 2012

(65) Prior Publication Data

US 2013/0279022 A1     Oct. 24, 2013

(30) Foreign Application Priority Data

Apr. 19, 2012  (TW) .............................. 101113971 A

(51) Int. Cl.
*G02B 3/02*   (2006.01)
*G02B 13/08*  (2006.01)
*G02B 13/00*  (2006.01)
*G02B 9/60*   (2006.01)

(52) U.S. Cl.
CPC .............. *G02B 13/0045* (2013.01); *G02B 9/60* (2013.01)
USPC .......................................... 359/714; 359/763

(58) Field of Classification Search
USPC ......... 359/714, 721, 726–728, 746, 753, 758, 359/764–769, 772–776
See application file for complete search history.

(56) References Cited

U.S. PATENT DOCUMENTS

| 7,639,432 | B2 * | 12/2009 | Asami | 359/770 |
| 2010/0253829 | A1 | 10/2010 | Shinohara | |
| 2011/0176049 | A1 * | 7/2011 | Hsieh et al. | 348/340 |
| 2012/0287513 | A1 * | 11/2012 | Hsu et al. | 359/714 |
| 2013/0003193 | A1 * | 1/2013 | Huang | 359/713 |

FOREIGN PATENT DOCUMENTS

TW           200914909          4/2009

* cited by examiner

*Primary Examiner* — Joseph P Martinez
*Assistant Examiner* — Brandi Thomas
(74) *Attorney, Agent, or Firm* — CKC & Partners Co., Ltd.

(57) ABSTRACT

An optical image system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power, wherein two surfaces of the third lens element are aspheric. The fourth lens element with refractive power has a convex image-side surface, wherein two surfaces of the fourth lens element are aspheric. The fifth lens element with refractive power has a concave image-side surface, wherein two surfaces of the fifth lens element are aspheric, and the fifth lens element has an inflection point on the image-side surface thereof.

21 Claims, 17 Drawing Sheets

US 8,988,789 B2

OPTICAL IMAGE SYSTEM

RELATED APPLICATIONS

The application claims priority to Taiwan Application Serial Number 101113971 filed Apr. 19, 2012, which is herein incorporated by reference.

BACKGROUND

1. Technical Field

The present invention relates to an optical image system. More particularly, the present invention relates to a compact optical image system applicable to electronic products.

2. Description of Related Art

In recent years, with the popularity of mobile products with camera functionalities, the demand for miniaturizing an optical lens system is increasing. The sensor of a conventional photographing camera is typically a CCD (Charge-Coupled Device) or a CMOS (Complementary Metal-Oxide-Semiconductor) sensor. As advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure, such as U.S. Pat. No. 7,969,664. Due to the popularity of mobile products with high-end specifications, such as smart phones and PDAs (Personal Digital Assistants), the pixel and image-quality requirements of the compact optical lens system have increased rapidly. However, the conventional four-element lens structure cannot satisfy the requirements of the compact optical lens system.

Another conventional compact optical lens system has five-element lens structure, such as U.S. Pat. No. 8,000,031. The optical lens system has a flat element located on the back focal location for filtering infrared rays or securing an image sensor. However, the total track length would be hardly reduced by the thickness of the flat element, and the essential distance between the flat element and other lens elements for avoiding interference.

SUMMARY

According to one aspect of the present disclosure, an optical image system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power, wherein an object-side surface and an image-side surface of the third lens element are aspheric. The fourth lens element with refractive power has a convex image-side surface, wherein an object-side surface and the mage-side surface of the fourth lens element are aspheric. The fifth lens element with refractive power has a concave image-side surface, wherein an object-side surface and the image-side surface of the fifth lens element are aspheric, and the fifth lens element has at least one inflection point on the image-side surface thereof. The optical image system further includes at least one flat element located between the fifth lens element and an image plane. When a focal length of the optical image system is f, a curvature radius of the image-side surface of the fifth lens element is R10, a distance between the optical axis and the non-axial critical point on the image-side surface of the fifth lens element is Yc52, an axial distance between the object-side surface of the first lens element and the image-side surface of the fifth lens element is Td, and a linear expansion coefficient of the flat element at 20° C. is αPE, the following relationships are satisfied:

$0<R10/f<1.0;$ $0.20<Yc52/Td<0.70;$ and $3.0\times10^{-5}(1/^\circ C.)<\alpha PE<10.0\times10^{-5}(1/^\circ C.),$ According to another aspect of the present disclosure, an optical image system includes, in order from an object side to an image side, a first lens element, a second lens element, a third lens element, a fourth lens element and a fifth lens element. The first lens element with positive refractive power has a convex object-side surface. The second lens element has refractive power. The third lens element has refractive power, wherein an object-side surface and an image-side surface of the third lens element are aspheric. The fourth lens element with refractive power has a concave object-side surface and a convex image-side surface, wherein the object-side surface and the image-side surface of the fourth lens element are aspheric. The fifth lens element with refractive power has a concave image-side surface, wherein an object-side surface and the image-side surface of the fifth lens element are aspheric, and the fifth lens element has at least one inflection point on the image-side surface thereof. The optical image system further includes at least one flat element located between the fifth lens element and an image plane. When a focal length of the optical image system is f, a curvature radius of the image-side surface of the fifth lens element is R10, a distance between the optical axis and the non-axial critical point on the image-side surface of the fifth lens element is Yc52, an axial distance between the object-side surface of the first lens element and the image-side surface of the fifth lens element is Td, an Abbe number of the flat element is VPE, and an Abbe number of the fifth lens element is V5, the following relationships are satisfied:

$0<R10/f<1.0;$ $0.20<Yc52/Td<0.70;$ and $2.2<e^{(VPE/V5)}<3.0.$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
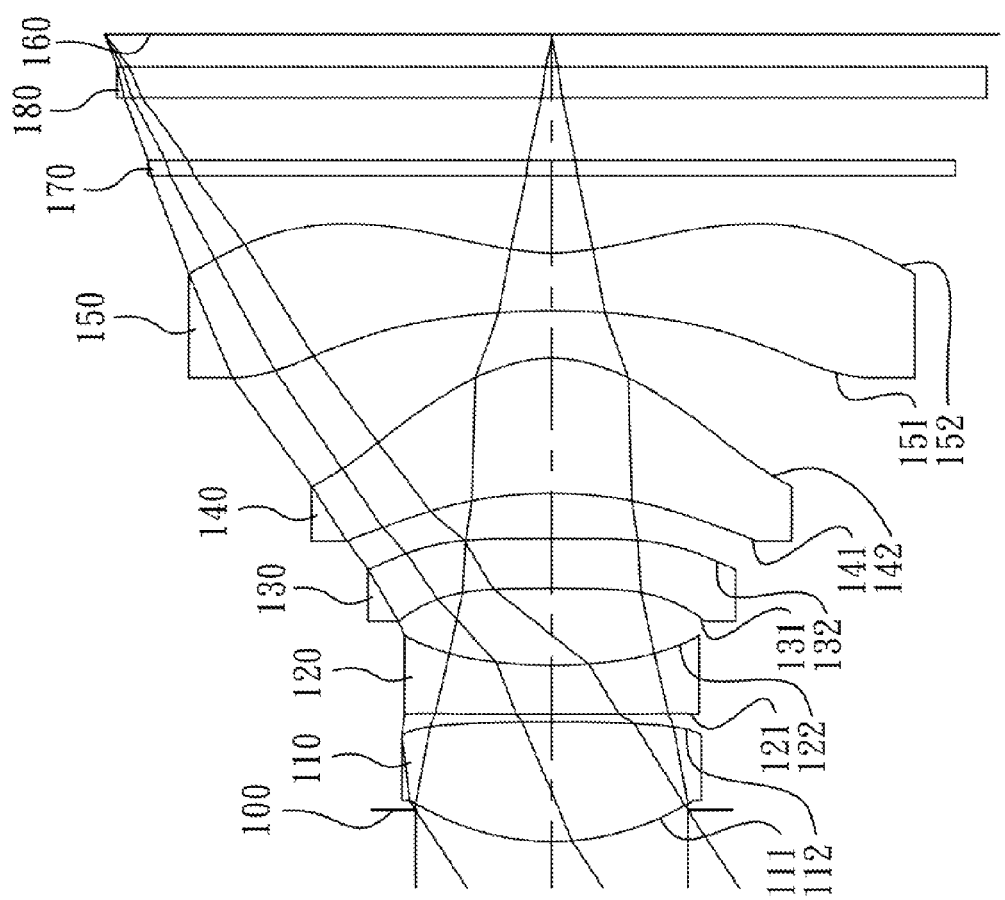
FIG. 1 is a schematic view of an optical image system according to the 1st embodiment of the present disclosure.

An optical image system includes, in order from an object side to an image side, a first lens element, a second lens element, a third lens element, a fourth lens element and a fifth lens element.

The first lens element with positive refractive power has a convex object-side surface, so that the total track length of the optical image system can be reduced by adjusting the positive refractive power of the first lens element.

The second lens element with negative refractive power corrects the aberration generated from the first lens element with positive refractive power.

The fourth lens element can have positive refractive power or negative refractive power. When the fourth lens element has positive refractive power, the positive refractive power of the first lens element can be balanced for the lower sensitivity of the optical image system while reducing the spherical aberration. When the fourth lens element has negative refractive power, the high order aberration of the optical image system can be corrected. The fourth lens element has a concave object-side surface and a convex image-side surface, so that the astigmatism of the optical image system can be corrected.

The fifth lens element with negative refractive power has a convex object-side surface and a concave image-side surface, so that the principal point of the optical image system can be positioned away from the image plane, and the total track length of the optical image system can be reduced so as to maintain the compact size of the optical image system. The fifth lens element has at least one inflection point on the image-side surface thereof, so that the incident angle of the off-axis field on an image plane can be effectively reduced and the aberration can be further corrected as well.

When a focal length of the optical image system is f, and a curvature radius of the image-side surface of the fifth lens element is R10, the following relationship is satisfied:

$$0 < R10/f < 1.0,$$

Therefore, the principal point of the optical image system can be positioned away from the image plane, and the total track length of the optical image system can be reduced so as to maintain the compact size of the optical image system.

When a distance between the optical axis and the non-axial critical point on the image-side surface of the fifth lens element is Yc52, and an axial distance between the object-side surface of the first lens element and the image-side surface of the fifth lens element is Td, the following relationship is satisfied:

$$0.20 < Yc52/Td < 0.70.$$

Therefore, the incident angle of the off-axis field on an image plane can be effectively reduced and the aberration can be further corrected as well.

The optical image system further includes at least one flat element located between the fifth lens element and an image plane. When a linear expansion coefficient of the flat element at 20° C. is αPE, the following relationship is satisfied:

$$3.0 \times 10^{-5} (1/°C.) < \alpha PE < 10.0 \times 10^{-5} (1/°C.$$

Therefore, the flat element with larger linear expansion coefficient can be manufactured easier, and the total track length of the optical image system can be reduced by facilitating the thinner flat element.

αPE can preferably satisfy the following relationship:

$$4.5 \times 10^{-5} (1/°C.) < \alpha PE < 10.0 \times 10^{-5} (1/°C.).$$

When an Abbe number of the flat element is VPE, and an Abbe number of the fifth lens element is V5, the following relationship is satisfied:

$$2.2 < e^{(VPE/V5)} < 3.0.$$

Therefore, the chromatic aberration of the optical image system can be corrected.

When the focal length of the optical image system is f, a focal length of the fourth lens element is f4, and a focal length of the fifth lens element is f5, the following relationship is satisfied:

$$3.0 < |f/f4| + |f/f5| < 5.5.$$

Therefore, the high order aberration and the astigmatism of the optical image system can be corrected by the proper refractive power of the fourth lens element and the fifth lens element for enhancing the resolving power thereof.

When the focal length of the optical image system is f, and a curvature radius of the image-side surface of the second lens element is R4, the following relationship is satisfied:

$$-0.5 < f/R4 \leq 0.$$

Therefore, the curvature of the image-side surface of the second lens element is proper for correcting the aberration generated from the first lens element.

f and R4 preferably satisfy the following relationship:

$$-0.2 < f/R4 \leq 0,$$

When a curvature radius of the object-side surface of the fourth lens element is R7, and a curvature radius of the image-side surface of the fourth lens element is R8, the following relationship is satisfied:

$$-0.4 < (R7-R8)/(R7+R8) < 0.8.$$

Therefore, the astigmatism of the optical image system can be corrected by the proper surface curvature of the fourth lens element.

When the focal length of the optical image system is f, and a focal length of the fourth lens element is f4, the following relationship is satisfied:

$$-1.0 < f/f4 < 0.$$

Therefore, the high order aberration of the optical image system can be corrected by the proper refractive power of the fourth lens element.

f and f4 preferably satisfy the following relationship:

$$-0.55 < f/f4 < 0.$$

When a central thickness of the flat element is CTPE, the following relationship is satisfied:

$$0.05 \text{ mm} < CTPE \leq 0.13 \text{ mm}.$$

Therefore, the total track length of the optical image system can be reduced.

When a central thickness of the second lens element is CT2, a central thickness of the third lens element is CT3, a central thickness of the fourth lens element is CT4, and a central thickness of the fifth lens element is CT5, the following relationship is satisfied:

$$0.3 < (CT2+CT3)/(CT4+CT5) < 0.7.$$

Therefore, the fabrication and manufacture of lens elements would be more proper in the optical image system.

According to the optical image system of the present disclosure, the lens elements thereof can be made of glass or plastic material. When the lens elements are made of glass material, the distribution of the refractive power of the optical image system may be more flexible to design. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. Therefore, the total track length of the optical image system can also be reduced.

According to the optical image system of the present disclosure, when the lens element has a convex surface, it indicates that the paraxial region of the surface is convex; and when the lens element has a concave surface, it indicates that the paraxial region of the surface is concave.

According to the optical image system of the present disclosure, the optical image system can include at least one stop, such as an aperture stop, a glare stop, or a field stop, etc. Said glare stop or said field stop is allocated for reducing stray light while retaining high image quality. Furthermore, when the stop is an aperture stop, the position of the aperture stop within an optical system can be arbitrarily placed in front of the entire lens assembly, within the lens assembly, or in front of the image plane in accordance with the preference of the optical designer, in order to achieve the desirable optical features or higher image quality produced from the optical system.

According to the above description of the present disclosure, the following 1st-8th specific embodiments are provided for further explanation.

1st Embodiment

Figure 2:
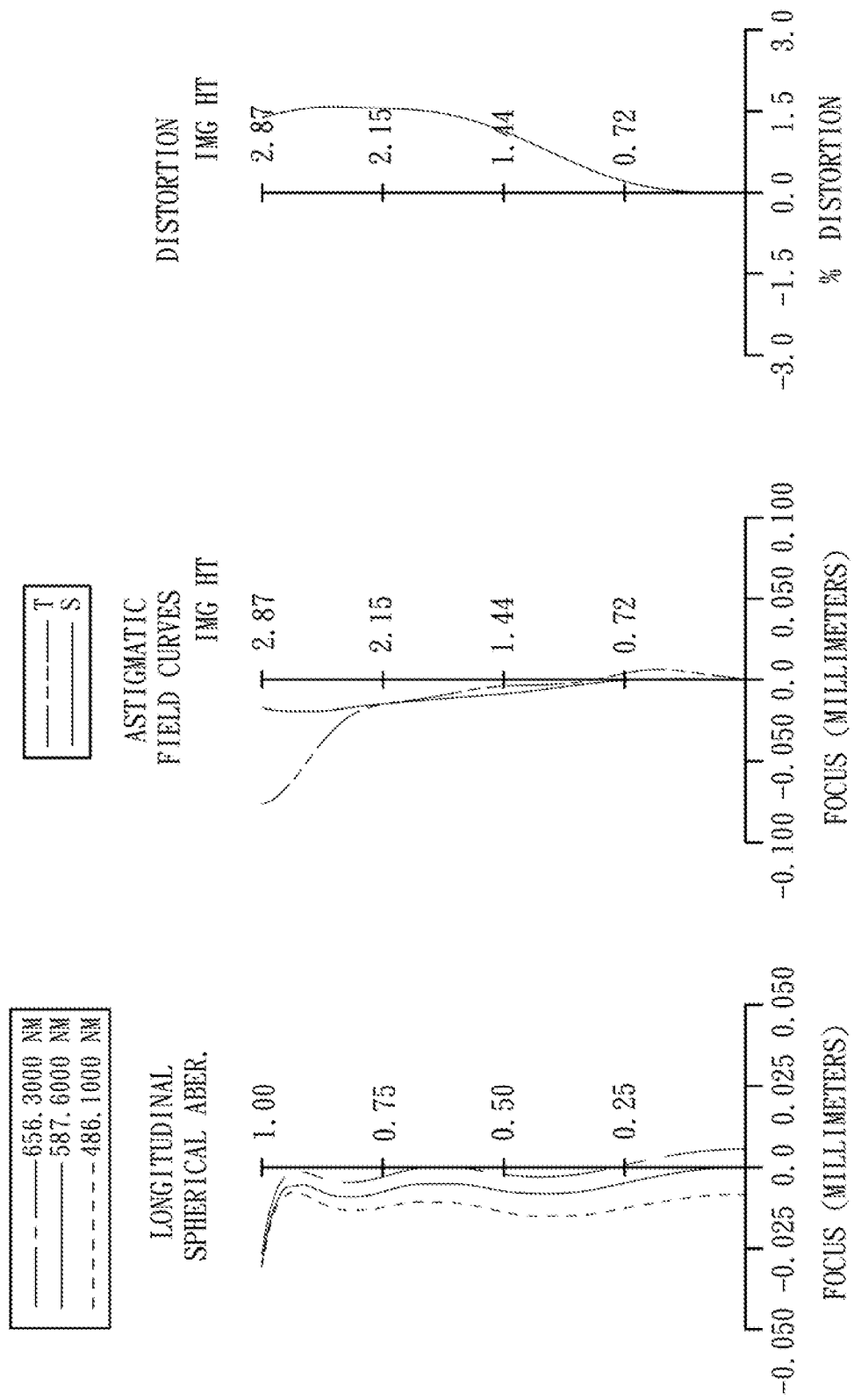
FIG. 2 shows spherical aberration curves, astigmatic field curves and a distortion curve of the optical image system according to the 1st embodiment.

FIG. 1 is a schematic view of an optical image system according to the 1st embodiment of the present disclosure. FIG. 2 shows spherical aberration curves, astigmatic field curves and a distortion curve of the optical image system according to the 1st embodiment. In FIG. 1 the optical image system includes, in order from an object side to an image side, an aperture stop 100, the first lens element 110, the second lens element 120, the third lens element 130, the fourth lens element 140, the fifth lens element 150, two flat elements 170, 180 and an image plane 160. The first, second, third, fourth, and fifth lens elements 110, 120, 130, 140, 150 are all made of plastic material.

The first lens element 110 with positive refractive power has a convex object-side surface 111 and a convex image-side surface 112. The object-side surface 111 and the image-side surface 112 of the first lens element 110 are aspheric.

The second lens element 120 with negative refractive power has a convex object-side surface 121 and a concave image-side surface 122. The object-side surface 121 and the image-side surface 122 of the second lens element 120 are aspheric.

The third lens element 130 with negative refractive power has a concave object-side surface 131 and a concave image-side surface 132. The object-side surface 131 and the image-side surface 132 of the third lens element 130 are aspheric.

The fourth lens element 140 with positive refractive power has a concave object-side surface 141 and a convex image-side surface 142. The object-side surface 141 and the image-side surface 142 of the fourth lens element 140 are aspheric.

The fifth lens element 150 with negative refractive power has a concave object-side surface 151 and a concave image-side surface 152. The object-side surface 151 and the image-side surface 152 of the fifth lens element 150 are aspheric, and the fifth lens element 150 has inflection points on the image-side surface 152 thereof.

The two flat elements 170, 180 are located between the fifth lens element 150 and the image plane 160, wherein the flat element 170 is made of plastic material and the flat element 180 is made of glass materiel, and will not affect the focal length of the optical image system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the distance between a point on the aspheric surface spaced at a distance Y from the optical axis and the tangential plane at the aspheric surface vertex on the optical axis;

V is the distance from the point on the aspheric surface to the optical axis;

R is the curvature radius;

k is the conic coefficient; and

Ai is the i-th aspheric coefficient.

In the optical image system according to the 1st embodiment, when a focal length of the optical in system is f, an f-number of the optical image system is Fno, and half of the maximal field of view of the optical image system is HFOV, these parameters have the following values:

$f$=4.28 mm;

$Fno$=245; and $HFOV$=33.5 degrees.

In the optical image system according to the 1st embodiment, when an Abbe number of the flat element 170 is VPE1, an Abbe number of the flat element 180 is VPE2, and an Abbe number of the fifth lens element 150 is V5, the following relationships are satisfied:

$$e^{(VPE1/V5)}=2.72; \text{ and}$$

$$e^{(VPE2/V5)}=3.15.$$

In the optical image system according to the 1st embodiment, when a linear expansion coefficient of the flat element 170 at 20° C. is αPE1, and a linear expansion coefficient of the flat element 180 at 20° C. is αPE2, the following relationships are satisfied:

$$\alpha PE1=6.00\times10^{-5}(1/°C.); \text{ and}$$

$$\alpha PE2=0.76\times10^{-5}(1/°C.).$$

In the optical image system according to the 1st embodiment, when a central thickness of the flat element 170 is CTPE1, and a central thickness of the flat element 180 is CTPE2, the following relationship is satisfied:

$$CTPE1=0.100 \text{ mm; and}$$

$$CTPE2=0.200 \text{ mm}.$$

In the optical image system according to the 1st embodiment, when a central thickness of the second lens element 120 is CT2, a central thickness of the third lens element 130 is CT3, a central thickness of the fourth lens element 140 is CT4, and a central thickness of the fifth lens element 150 is CT5, the following relationship is satisfied:

$$(CT2+CT3)/(CT4+CT5)=0.51.$$

In the optical image system according to the 1st embodiment, when the focal length of the optical image system is f, a curvature radius of the image-side surface 122 of the second lens element 120 is R4, a curvature radius of the object-side surface 141 of the fourth lens element 140 is R7, a curvature radius of the image-side surface 142 of the fourth lens element 140 is R8, and a curvature radius of the image-side surface 152 of the fifth lens element 150 is R10, and the following relationships are satisfied:

$$R10/f=0.33;$$

$$f/R4=1.46; \text{ and}$$

$$(R7-R8)/(R7+R8)=0.52.$$

In the optical image system according to the 1st embodiment, when the focal length of the optical image system is f, a focal length of the fourth lens element 140 is f4, and a focal length of the fifth lens element 150 is f5, the following relationships are satisfied:

$$f/f4=2.14; \text{ and}$$

$$|f/f4|+|f/f5|=4.36.$$

Figure 17:
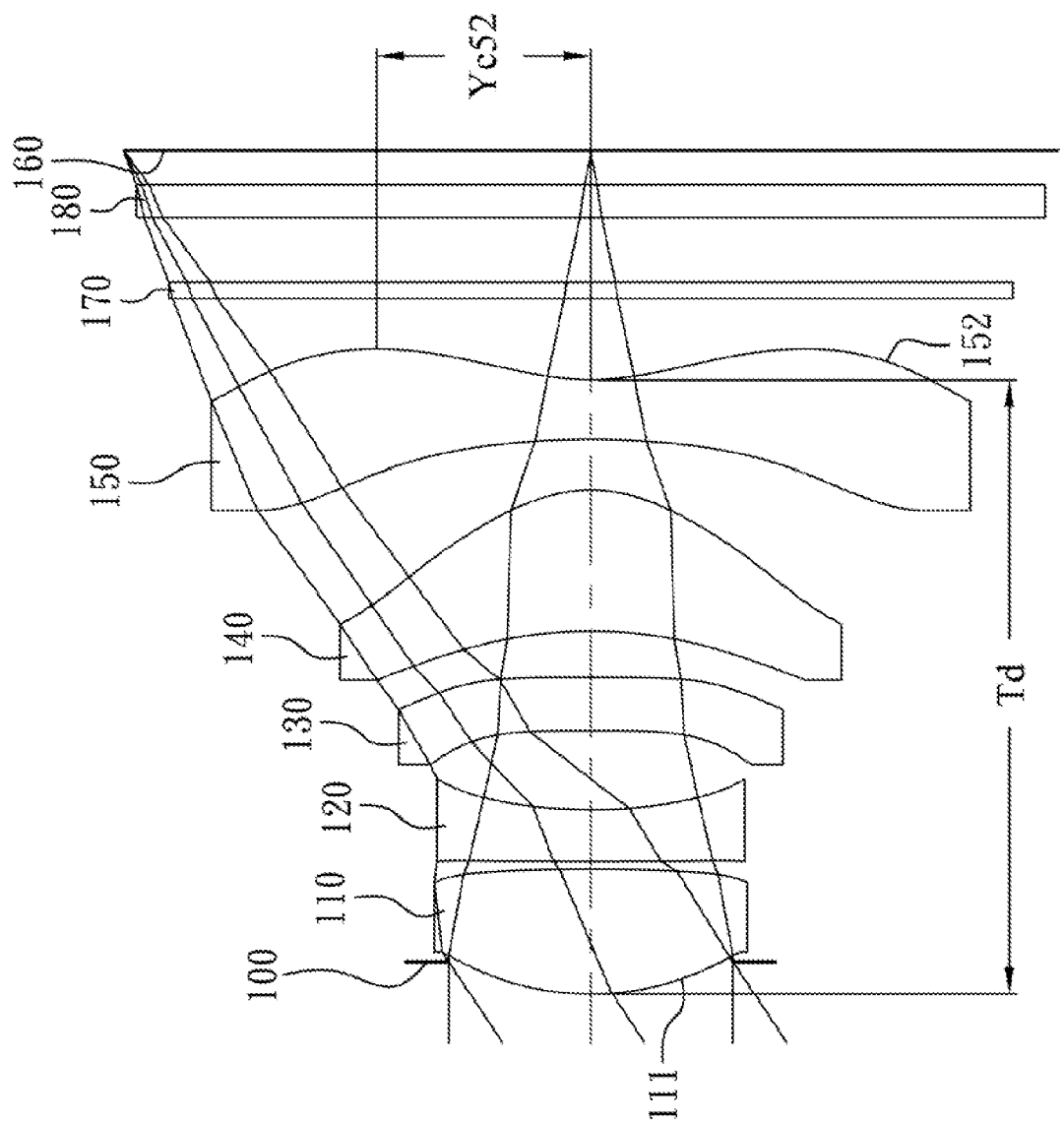
FIG. 17 shows Yc52 of the fifth lens element of FIG. 1.

FIG. 17 shows Yc52 of the fifth lens element 150 of FIG. 1. In FIG. 17, when a distance between the optical axis and the non-axial critical point on the image-side surface 152 of the fifth lens element 150 is Yc52, and an axial distance between the object-side surface 111 of the first lens element 110 and the image-side surface 152 of the fifth lens element 150 is Td, the following relationship is satisfied:

$$Yc52/Td=0.35.$$

The detailed optical data of the 1st embodiment are shown in Table 1 and the aspheric surface data are shown in Table 2 below.

TABLE 1

1st Embodiment
f = 4.28 mm, Fno = 2.45, HFOV = 33.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.200 | | | | |
| 2 | Lens 1 | 1.668 (ASP) | 0.770 | Plastic | 1.544 | 55.9 | 2.78 |
| 3 | | −13.608 (ASP) | 0.048 | | | | |
| 4 | Lens 2 | 100.000 (ASP) | 0.314 | Plastic | 1.634 | 23.8 | −4.78 |
| 5 | | 2.938 (ASP) | 0.491 | | | | |
| 6 | Lens 3 | −40.825 (ASP) | 0.323 | Plastic | 1.634 | 23.8 | −40.30 |
| 7 | | 38.514 (ASP) | 0.289 | | | | |
| 8 | Lens 4 | −2.785 (ASP) | 0.869 | Plastic | 1.544 | 55.9 | 2.01 |
| 9 | | −0.870 (ASP) | 0.309 | | | | |
| 10 | Lens 5 | −4.385 (ASP) | 0.368 | Plastic | 1.544 | 55.9 | −1.93 |
| 11 | | 1.418 (ASP) | 0.500 | | | | |
| 12 | Flat element | Plano | 0.100 | Plastic | 1.544 | 55.9 | — |
| 13 | | Plano | 0.400 | | | | |
| 14 | Flat element | Plano | 0.200 | Glass | 1.517 | 64.2 | — |
| 15 | | Plano | 0.210 | | | | |
| 16 | Image | Plano | — | | | | |

Note:
Reference wavelength (d-line) is 587.6 nm.

TABLE 2

Aspheric Coefficients

| Surface # | 2 | 3 | 4 | 5 | 6 |
|---|---|---|---|---|---|
| k = | −7.7101E+00 | 1.4859E+01 | 9.0000E+01 | 3.6144E+00 | −9.0000E+01 |
| A4 = | 2.0169E−01 | −2.1830E−02 | −1.4745E−02 | −3.4070E−02 | −1.7626E−01 |

TABLE 2-continued

Aspheric Coefficients

| A6 = | −1.8297E−01 | 6.2503E−02 | 1.6928E−02 | 4.3714E−02 | −1.5676E−01 |
|---|---|---|---|---|---|
| A8 = | 1.4073E−01 | −2.0313E−01 | 2.3768E−01 | 1.4178E−01 | 2.4953E−01 |
| A10 = | −3.3096E−02 | 2.8578E−01 | −6.5720E−01 | −3.4365E−01 | −2.1567E−01 |
| A12 = | −5.3116E−02 | −2.6943E−01 | 6.8022E−01 | 3.3589E−01 | 9.0635E−02 |
| A14 = | 2.2808E−02 | 7.6881E−02 | −2.8415E−01 | −1.1607E−01 | |

| Surface # | 7 | 8 | 9 | 10 | 11 |
|---|---|---|---|---|---|
| k = | −9.0000E+01 | 2.9925E+00 | −3.1884E+00 | −4.8902E+01 | −1.0640E+01 |
| A4 = | −1.1006E−01 | 1.0420E−03 | −1.2211E−01 | −1.6253E−02 | −5.0047E−02 |
| A6 = | −9.9772E−02 | 8.2957E−02 | 1.1326E−01 | −2.0160E−02 | 1.1927E−02 |
| A8 = | 1.2073E−01 | −1.7497E−01 | −8.6799E−02 | 8.4752E−03 | −3.8783E−03 |
| A10 = | −4.9206E−02 | 1.9584E−01 | 4.3460E−02 | −5.7594E−04 | 9.4774E−04 |
| A12 = | 1.0996E−02 | −9.5771E−02 | −9.7403E−03 | −1.1783E−04 | −1.3224E−04 |
| A14 = | | 1.7883E−02 | 6.7719E−04 | 1.4104E−05 | 7.9313E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an to explanation in this regard will not be provided again.

2nd Embodiment

Figure 3:
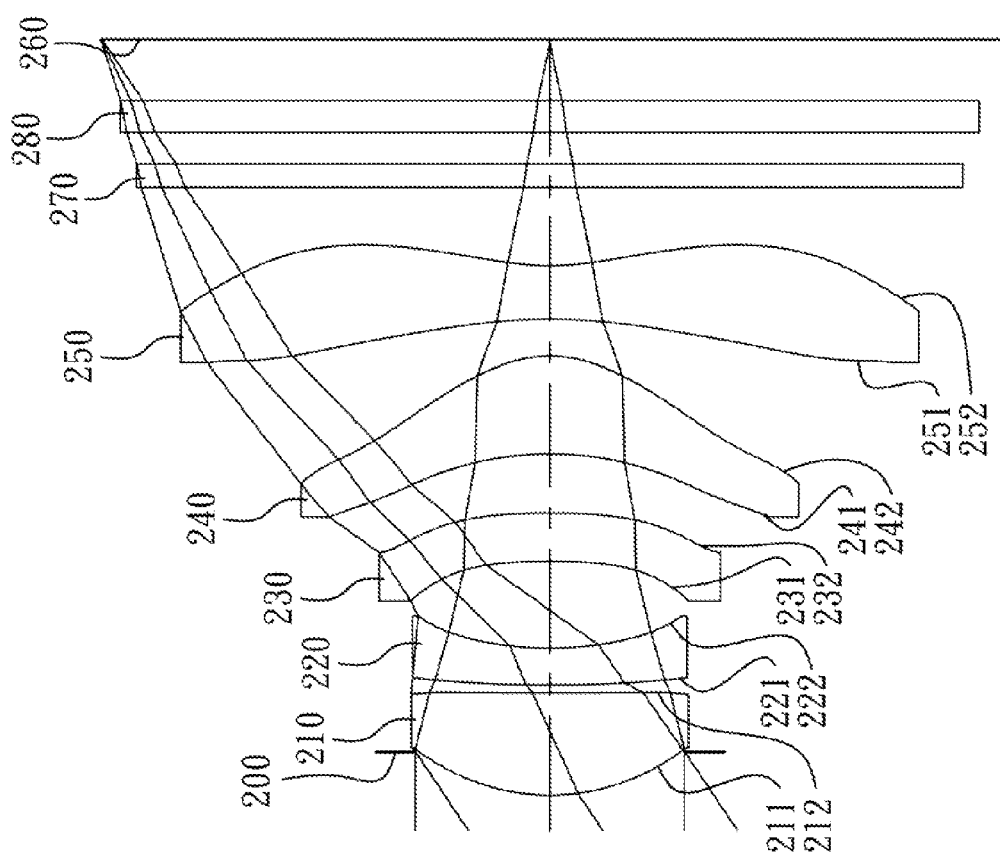
FIG. 3 is a schematic view of an optical image system according to the 2nd embodiment of the present disclosure.
Figure 4:
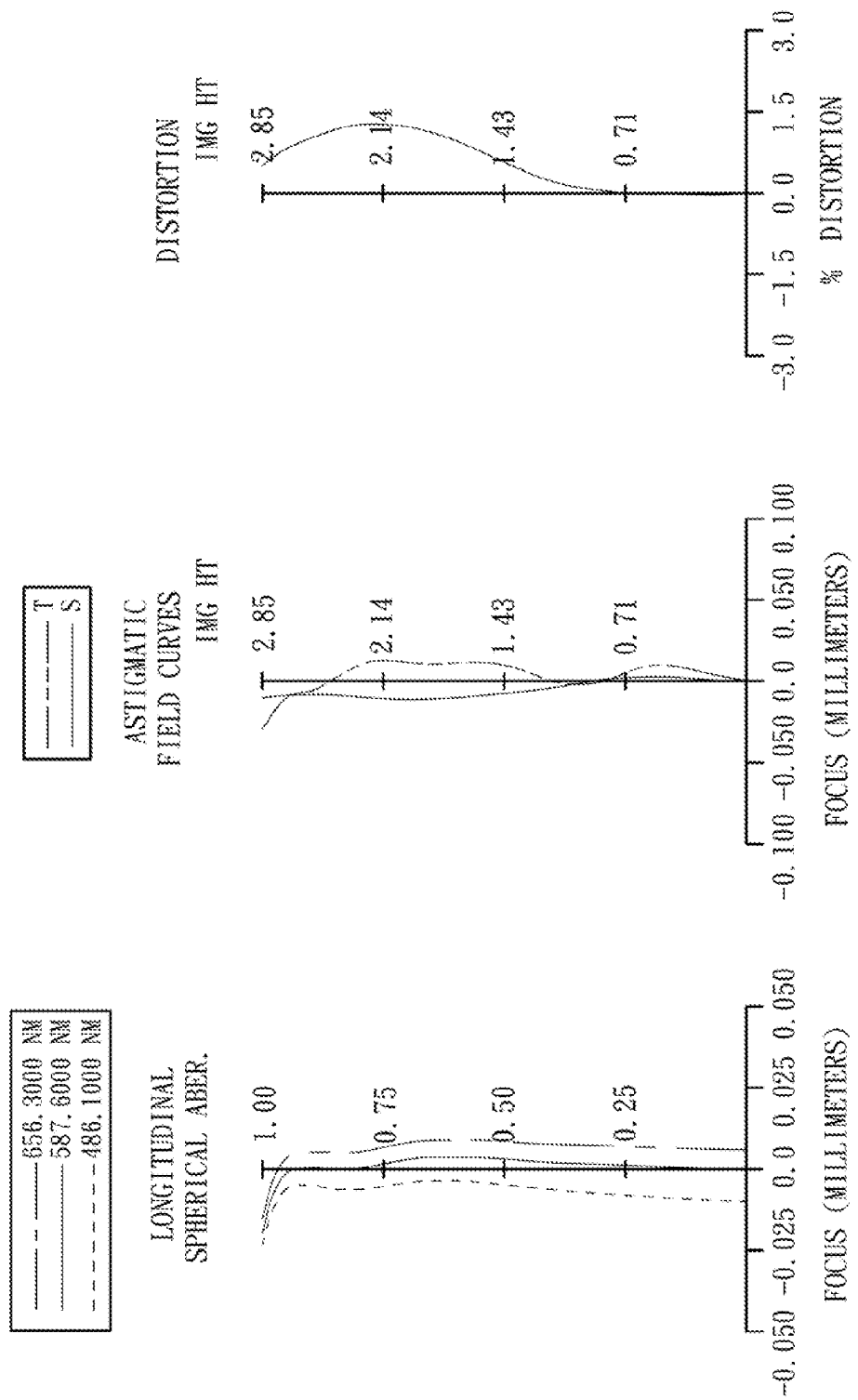
FIG. 4 shows spherical aberration curves, astigmatic field curves and a distortion curve of the optical image system according to the 2nd embodiment.

FIG. 3 is a schematic view of an optical image system according to the 2nd embodiment of the present disclosure. FIG. 4 shows spherical aberration curves, astigmatic field curves and a distortion curve of the optical image system according to the 2nd embodiment. In FIG. 3, the optical image system includes, in order from an object side to an image side, an aperture stop 200, the first lens element 210, the second lens element 220, the third lens element 230, the fourth lens element 240, the fifth lens element 250, two flat elements 270, 280 and an image plane 260. The first, second, third, fourth, and fifth lens elements 210, 220, 230, 240, 250 are all made of plastic material.

The first lens element 210 with positive refractive power has a convex object-side surface 211 and a concave image-side surface 212. The object-side surface 211 and the image-side surface 212 of the first lens element 210 are aspheric.

The second lens element 220 with negative refractive power has a convex object-side surface 221 and a concave image-side surface 222. The object-side surface 221 and the image-side surface 222 of the second lens element 220 are aspheric.

The third lens element 230 with negative refractive power has a concave object-side surface 231 and a convex image-side surface 232. The object-side surface 231 and the image-side surface 232 of the third lens element 230 are aspheric.

The fourth lens element 240 with positive refractive power has a concave object-side surface 241 and a convex image-side surface 242. The object-side surface 241 and the image-side surface 242 of the fourth lens element 240 are aspheric.

The fifth lens element 250 with negative refractive power has a concave object-side surface 251 and a concave image-side surface 252. The object-side surface 251 and the image-side surface 252 of the fifth lens element 250 are aspheric, and the fifth lens element 250 has inflection points on the image-side surface 252 thereof.

The two flat elements 270, 280 are located between the fifth lens element 250 and the image plane 260, wherein the flat elements 270, 280 are made of plastic material, and will not affect the focal length of the optical image system.

The detailed optical data of the 2nd embodiment are shown in Table 3 and the aspheric surface data are shown in Table 4 below.

TABLE 3

2nd Embodiment
f = 4.21 mm, Fno = 2.45, HFOV = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.277 | | | | |
| 2 | Lens 1 | 1.396 (ASP) | 0.655 | Plastic | 1.544 | 55.9 | 2.60 |
| 3 | | 80.464 (ASP) | 0.050 | | | | |
| 4 | Lens 2 | 7.545 (ASP) | 0.235 | Plastic | 1.640 | 23.3 | −4.72 |
| 5 | | 2.131 (ASP) | 0.553 | | | | |
| 6 | Lens 3 | −3.920 (ASP) | 0.310 | Plastic | 1.640 | 23.3 | −43.84 |
| 7 | | −4.698 (ASP) | 0.373 | | | | |
| 8 | Lens 4 | −2.155 (ASP) | 0.626 | Plastic | 1.544 | 55.9 | 1.90 |
| 9 | | −0.769 (ASP) | 0.239 | | | | |
| 10 | Lens 5 | −2.831 (ASP) | 0.340 | Plastic | 1.544 | 55.9 | −1.78 |
| 11 | | 1.538 (ASP) | 0.500 | | | | |
| 12 | Flat element | Plano | 0.150 | Plastic | 1.522 | 52.2 | — |
| 13 | | Plano | 0.200 | | | | |

TABLE 3-continued

2nd Embodiment
f = 4.21 mm, Fno = 2.45, HFOV = 34.0 deg.

| Surface # | | Curvature Radius | Thickness | Material | Index | Abbe # | Focal length |
|---|---|---|---|---|---|---|---|
| 14 | Flat element | Plano | 0.200 | Plastic | 1.514 | 56.8 | — |
| 15 | | Plano | 0.392 | | | | |
| 16 | Image | Plano | — | | | | |

Note:
Reference wavelength (d-line) is 587.6 nm

TABLE 4

Aspheric Coefficients

| Surface # | 2 | 3 | 4 | 5 | 6 |
|---|---|---|---|---|---|
| k = | −4.8394E+00 | −9.0000E+01 | −9.0000E+01 | 2.3168E+00 | −5.8504E+00 |
| A4 = | 2.2381E−01 | −2.1291E−02 | −3.1803E−02 | −5.3720E−02 | −1.9824E−01 |
| A6 = | −1.3584E−01 | 1.0709E−01 | 9.8400E−02 | 5.8197E−02 | −1.8091E−01 |
| A8 = | 9.7250E−02 | −2.3502E−01 | 1.1275E−01 | 1.5507E−01 | 2.1609E−01 |
| A10 = | 1.8010E−03 | 2.8208E−01 | −5.9041E−01 | −2.8740E−01 | −2.0856E−01 |
| A12 = | −4.5131E−02 | −2.8902E−01 | 7.0139E−01 | 5.7887E−02 | 1.1251E−01 |
| A14 = | 2.0672E−03 | 1.0558E−01 | −2.8685E−01 | 2.5199E−01 | 2.6578E−02 |
| A16 = | | | | | −7.9172E−03 |

| Surface # | 7 | 8 | 9 | 10 | 11 |
|---|---|---|---|---|---|
| k = | −1.2805E+01 | 1.0477E+00 | −3.2146E+00 | −2.9391E+01 | −1.6478E+01 |
| A4 = | −1.4140E−01 | −4.6299E−02 | −1.7236E−01 | −2.3025E−02 | −8.4240E−02 |
| A6 = | −8.6961E−02 | 1.1889E−01 | 1.9701E−01 | 4.1591E−02 | 5.4647E−02 |
| A8 = | 9.2534E−02 | −1.6840E−01 | −1.2353E−01 | −3.5866E−02 | −2.9167E−02 |
| A10 = | −3.2953E−02 | 1.9557E−01 | 6.0235E−02 | 1.5862E−02 | 9.8535E−03 |
| A12 = | 3.6933E−02 | −9.8567E−02 | −1.6575E−02 | −3.7349E−03 | −2.0614E−03 |
| A14 = | 9.5582E−03 | 1.7046E−02 | 1.3271E−03 | 4.5632E−04 | 2.4293E−04 |
| A16 = | −9.8087E−03 | 3.3682E−04 | 9.0365E−05 | −2.3119E−05 | −1.2136E−05 |

In the optical image system according to the 2nd embodiment, the definitions of f, Fno, HFOV, VPE1 VPE2, V5, αPE1, αPE2, CTPE1, CTPE2, CT2, CT3, CT4, CT5, R10, R4, R7, R8, f4, f5, Yc52 and Td are the same as those stated in the 1st embodiment with corresponding values for the 2nd embodiment. Moreover, these parameters can be calculated from Table 3 and Table 4 as the following values and satisfy the following relationships:

| f (mm) | 4.21 | CTPE2 (mm) | 0.200 |
|---|---|---|---|
| Fno | 2.45 | (CT2 + CT3)/(CT4 + CT5) | 0.56 |
| HFOV (deg.) | 34.0 | R10/f | 0.37 |
| $e^{(VPE1/V5)}$ | 2.54 | f/R4 | 1.97 |
| $e^{(VPE2/V5)}$ | 2.76 | (R7 − R8)/(R7 + R8) | 0.47 |
| αPE1(1/° C.) | 9.20 × 10⁻⁵ | f/f4 | 2.22 |
| αPE2(1/° C.) | 6.10 × 10⁻⁵ | |f/f4| + |f/f5| | 4.58 |
| CTPE1 (mm) | 0.150 | Yc52/Td | 0.35 |

3rd Embodiment

Figure 5:
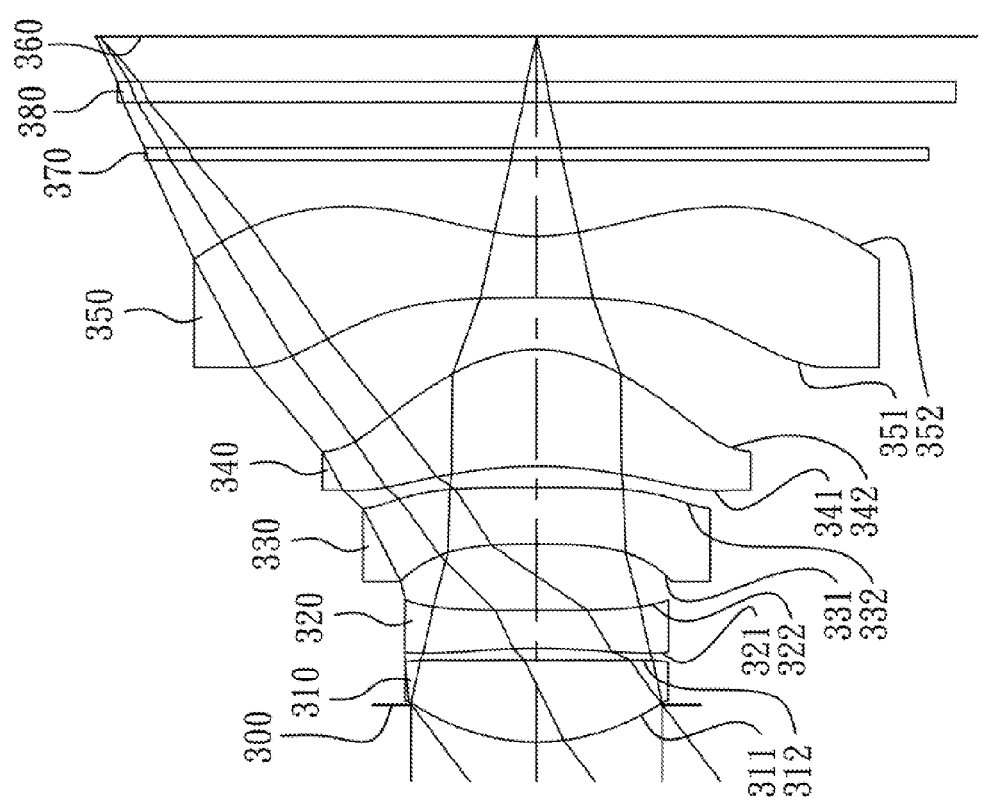
FIG. 5 is a schematic view of an optical image system according to the 3rd embodiment of the present disclosure.
Figure 6:
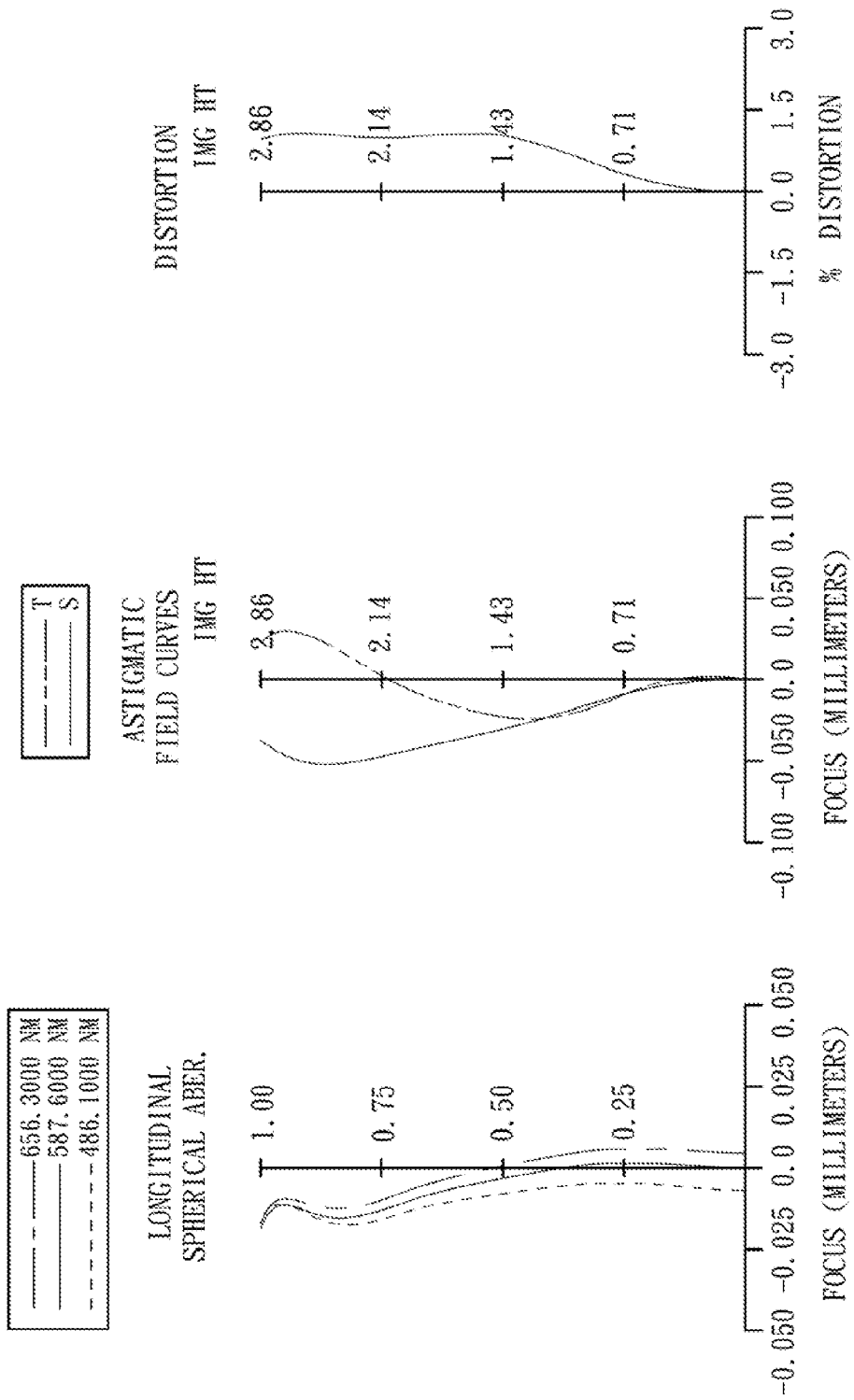
FIG. 6 shows spherical aberration curves, astigmatic field curves and a distortion curve of the optical image system according to the 3rd embodiment.

FIG. 5 is a schematic view of an optical image system according to the 3rd embodiment of the present disclosure. FIG. 6 shows spherical aberration curves, astigmatic field curves and a distortion curve of the optical image system according to the 3rd embodiment. In FIG. 5, the optical image system includes, in order from an object side to an image side, an aperture stop 300, the first lens element 310, the second lens element 320, the third lens element 330, the fourth lens element 340, the fifth lens element 350, two flat elements 370, 380 and an image plane 360. The first, second, third, fourth, and fifth lens elements 310, 320, 330, 340, 350 are all made of plastic material.

The first lens element 310 with positive refractive power has a convex object-side surface 311 and a convex image-side surface 312. The object-side surface 311 and the image-side surface 312 of the first lens element 310 are aspheric.

The second lens element 320 with negative refractive power has a concave object-side surface 321 and a convex image-side surface 322. The object-side surface 321 and the image-side surface 322 of the second lens element 320 are aspheric.

The third lens element 330 with negative refractive power has a concave object-side surface 331 and a convex image-side surface 332. The object-side surface 331 and the image-side surface 332 of the third lens element 330 are aspheric.

The fourth lens element 340 with positive refractive power has a concave object-side surface 341 and a convex image-side surface 342. The object-side surface 341 and the image-side surface 342 of the fourth lens element 340 are aspheric.

The fifth lens element 350 with negative refractive power has a concave object-side surface 351 and a concave image-side surface 352. The object-side surface 351 and the image-side surface 352 of the fifth lens element 350 are aspheric, and the fifth lens element 350 has inflection points on the image-side surface 352 thereof.

The two flat elements 370, 380 are located between the fifth lens element 350 and the image plane 360, wherein the flat elements 370, 380 are made of plastic material, and will not affect the focal length of the optical image system.

The detailed optical data of the 3rd embodiment are shown in Table 5 and the aspheric surface data are shown in Table 6 below.

TABLE 5

3rd Embodiment
f = 3.70 mm, Fno = 2.25, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.242 | | | | |
| 2 | Lens 1 | 1.447 (ASP) | 0.536 | Plastic | 1.544 | 55.9 | 2.63 |
| 3 | | −100.000 (ASP) | 0.078 | | | | |
| 4 | Lens 2 | −4.100 (ASP) | 0.250 | Plastic | 1.640 | 23.3 | −6.69 |
| 5 | | −100.000 (ASP) | 0.430 | | | | |
| 6 | Lens 3 | −5.936 (ASP) | 0.373 | Plastic | 1.640 | 23.3 | −10.59 |
| 7 | | −48.985 (ASP) | 0.140 | | | | |
| 8 | Lens 4 | −2.715 (ASP) | 0.765 | Plastic | 1.544 | 55.9 | 2.05 |
| 9 | | −0.868 (ASP) | 0.337 | | | | |
| 10 | Lens 5 | −13.207 (ASP) | 0.403 | Plastic | 1.544 | 55.9 | −2.09 |
| 11 | | 1.256 (ASP) | 0.500 | | | | |
| 12 | Flat element | Plano | 0.080 | Plastic | 1.514 | 56.8 | — |
| 13 | | Plano | 0.300 | | | | |
| 14 | Flat element | Plano | 0.130 | Plastic | 1.514 | 56.8 | — |
| 15 | | Plano | 0.301 | | | | |
| 16 | Image | Plano | — | | | | |

Note:
Reference wavelength (d-line) is 587.6 nm.

TABLE 6

Aspheric Coefficients

| Surface # | 2 | 3 | 4 | 5 | 6 |
|---|---|---|---|---|---|
| k = | −6.7826E+00 | −1.0000E+00 | −4.8003E+01 | −1.0000E+00 | −3.0719E+01 |
| A4 = | 2.7463E−01 | 2.8473E−03 | 4.0247E−02 | 1.2700E−01 | −1.8847E−01 |
| A6 = | −2.3847E−01 | 8.0899E−02 | 1.0643E−01 | −3.3021E−02 | −27655E−01 |
| A8 = | 1.9963E−01 | −1.7936E−01 | 6.2818E−02 | 1.3089E−01 | 3.5481E−01 |
| A10 = | −7.0374E−02 | 1.6908E−01 | −6.9163E−01 | −3.0664E−01 | −2.8447E−01 |
| A12 = | 2.1122E−02 | −2.7173E−01 | 8.8140E−01 | 2.5935E−01 | 7.5860E−02 |
| A14 = | −7.8940E−02 | 1.4822E−01 | −3.0125E−01 | 4.4046E−03 | |

| Surface # | 7 | 8 | 9 | 10 | 11 |
|---|---|---|---|---|---|
| k = | −1.0000E+00 | 3.0852E+00 | −3.0691E+00 | −6.0144E+00 | −7.7571E+00 |
| A4 = | −6.2101E−02 | 6.4139E−02 | −1.6750E−01 | −6.6313E−02 | −8.3965E−02 |
| A6 = | −1.1258E−01 | 8.9366E−02 | 1.5228E−01 | −1.2727E−02 | 2.8334E−02 |
| A8 = | 1.0152E−01 | −2.4301E−01 | −1.2241E−01 | 1.2304E−02 | −9.1864E−03 |
| A10 = | −4.6956E−02 | 2.7449E−01 | 6.8495E−02 | −9.9143E−04 | 2.1381E−03 |
| A12 = | 2.3276E−02 | −1.2861E−01 | −8.1785E−03 | −2.9463E−04 | −2.8950E−04 |
| A14 = | | 2.3304E−02 | −2.1925E−03 | 3.8469E−05 | 1.6653E−05 |

In the optical image system according to the 3rd embodiment, the definitions of f, Fno, HFOV, VPE1, VPE2, V5, αPE1, αPE2, CTPE1, CTPE2, CT2, CT3, CT4, CT5, R10, R4, R7, R8, f4, f5, Yc52 and Td are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 3.70 | CTPE2 (mm) | 0.130 |
| Fno | 2.25 | (CT2 + CT3)/(CT4 + CT5) | 0.53 |
| HFOV (deg.) | 37.5 | R10/f | 0.34 |
| $e^{(VPE1/V5)}$ | 2.76 | f/R4 | −0.04 |
| $e^{(VPE2/V5)}$ | 2.76 | (R7 − R8)/(R7 + R8) | 0.52 |
| αPE1(1/° C.) | 6.10 × 10⁻⁵ | f/f4 | 1.80 |
| αPE2(1/° C.) | 6.10 × 10⁻⁵ | |f/f4| + |f/f5| | 3.58 |
| CTPE1 (mm) | 0.080 | Yc52/Td | 0.38 |

4th Embodiment

Figure 7:
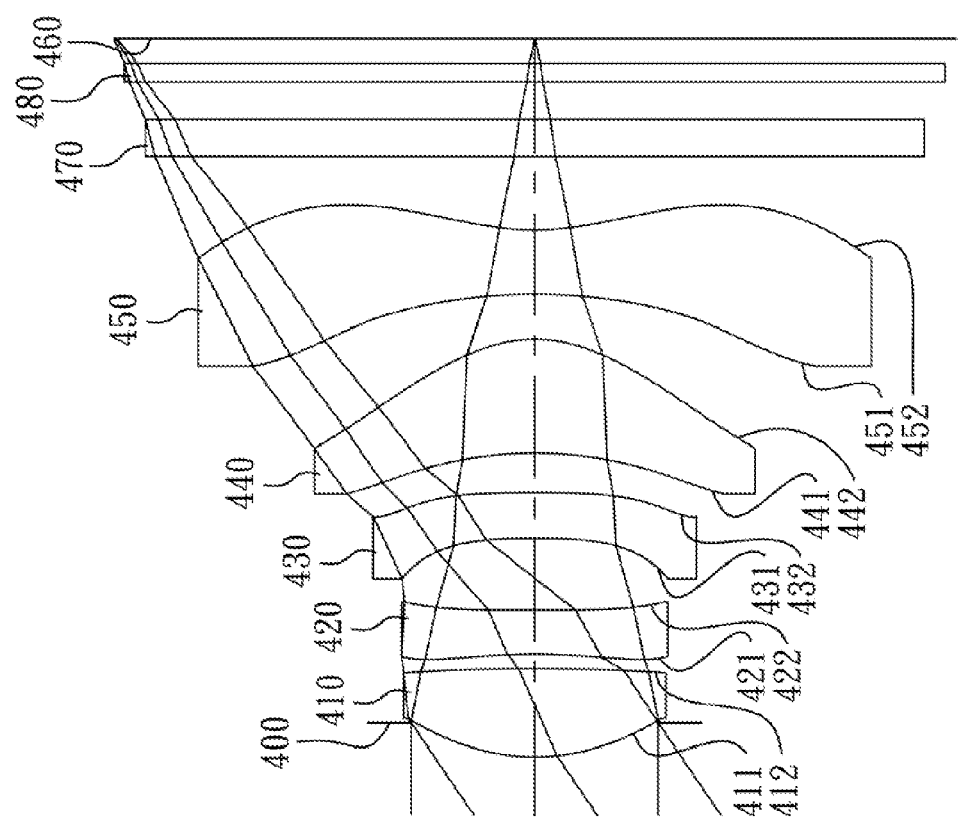
FIG. 7 is a schematic view of an optical image system according to the 4th embodiment of the present disclosure.
Figure 8:
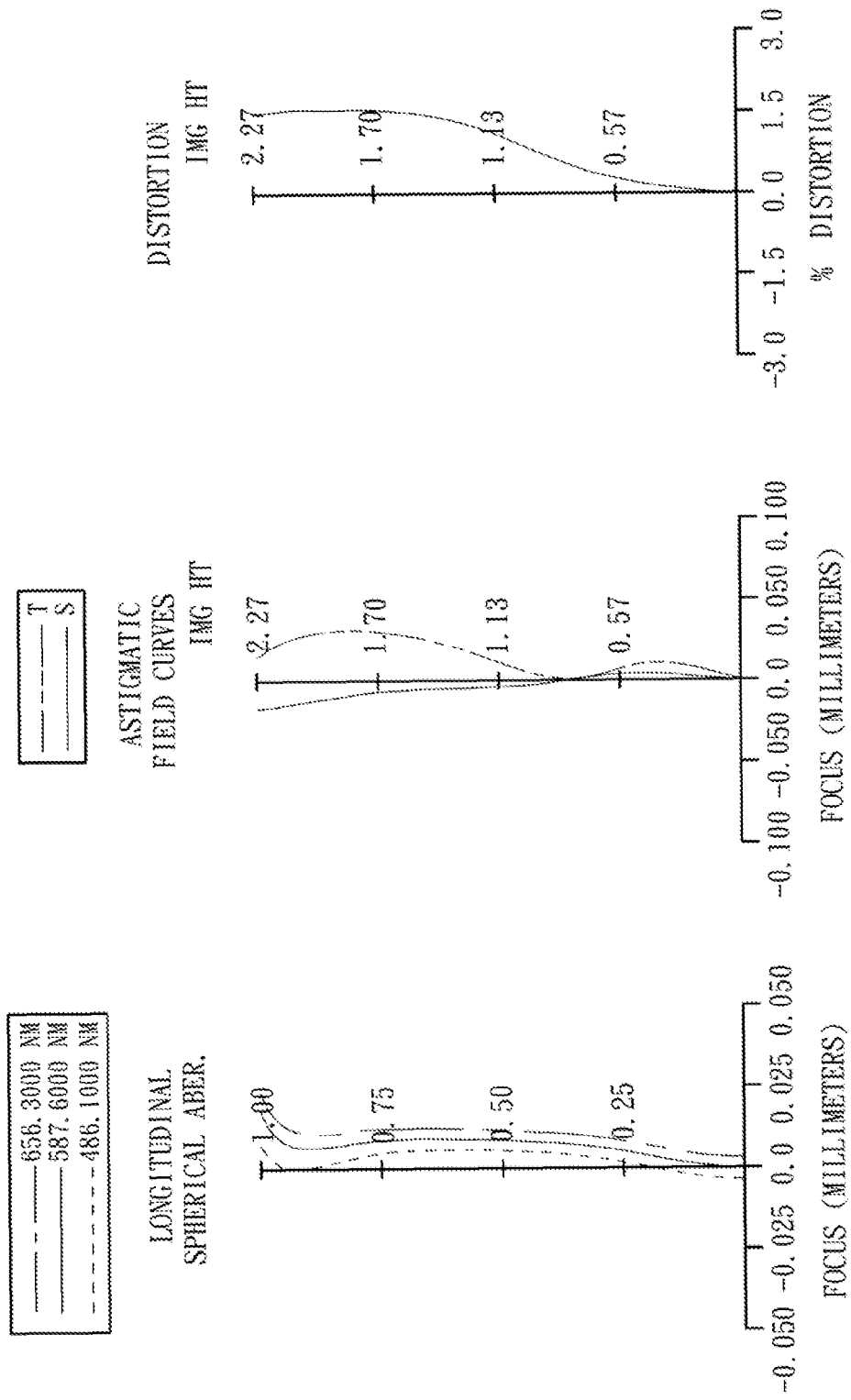
FIG. 8 shows spherical aberration curves, astigmatic field curves and a distortion curve of the optical image system according to the 4th embodiment.

FIG. 7 is a schematic view of an optical image system according to the 4th embodiment of the present disclosure. FIG. 8 shows spherical aberration curves, astigmatic field curves and a distortion curve of the optical image system according to the 4th embodiment. In FIG. 7, the optical image system includes, in order from an object side to an image side, an aperture stop 400, the first lens element 410, the second lens element 420, the third lens element 430, the fourth lens element 440, the fifth lens element 450, two flat elements 470, 480 and an image plane 460. The first, second, third, fourth, and fifth lens elements 410, 420, 430, 440, 450 are all made of plastic material.

The first lens element 410 with positive refractive power has a convex object-side surface 411 and a convex image-side surface 412. The object-side surface 411 and the image-side surface 412 of the first lens element 410 are aspheric.

The second lens element 420 with negative refractive power has a concave object-side surface 421 and a convex image-side surface 422. The object-side surface 421 and the image-side surface 422 of the second lens element 420 are aspheric.

The third lens element 430 with negative refractive power has a concave object-side surface 431 and a convex image-side surface 432. The object-side surface 431 and the image-side surface 432 of the third lens element 430 are aspheric.

The fourth lens element 440 with positive refractive power has a concave object-side surface 441 and a convex image-side surface 442. The object-side surface 441 and the image-side surface 442 of the fourth lens element 440 are aspheric.

The fifth lens element 450 with negative refractive power has a concave object-side surface 451 and a concave image-side surface 452. The object-side surface 451 and the image-side surface 452 of the fifth lens element to 450 are aspheric, and the fifth lens element 450 has inflection points on the image-side surface 452 thereof.

The two flat elements 470, 480 are located between the fifth lens element 450 and the image plane 460, wherein the flat element 470 is made of glass material, the flat element 480 is made of plastic material, and will not affect the focal length of the optical image system.

The detailed optical data of the 4th embodiment are shown in Table 7 and the aspheric surface data are shown in Table 8 below.

TABLE 7

4th Embodiment
f = 3.28 mm, Fno = 2.45, HFOV = 34.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.182 | | | | |
| 2 | Lens 1 | 1.185 | (ASP) | 0.479 | Plastic | 1.544 | 55.9 | 1.98 |
| 3 | | −10.335 | (ASP) | 0.073 | | | | |
| 4 | Lens 2 | −2.895 | (ASP) | 0.240 | Plastic | 1.640 | 23.3 | −4.66 |
| 5 | | −100.000 | (ASP) | 0.385 | | | | |
| 8 | Lens 3 | −4.354 | (ASP) | 0.250 | Plastic | 1.640 | 23.3 | −10.95 |
| 7 | | −11.766 | (ASP) | 0.215 | | | | |
| 8 | Lens 4 | −2.120 | (ASP) | 0.617 | Plastic | 1.544 | 55.9 | 1.71 |
| 9 | | −0.714 | (ASP) | 0.241 | | | | |
| 10 | Lens 5 | −2.594 | (ASP) | 0.350 | Plastic | 1.544 | 55.9 | −1.51 |
| 11 | | 1.259 | (ASP) | 0.400 | | | | |
| 12 | Flat element | Plano | | 0.200 | Glass | 1.517 | 64.2 | — |
| 13 | | Plano | | 0.200 | | | | |
| 14 | Flat element | Plano | | 0.100 | Plastic | 1.514 | 56.8 | — |
| 15 | | Plano | | 0.136 | | | | |
| 16 | Image | Plano | | — | | | | |

Note:
Reference wavelength (d-line) is 587.6 nm.

TABLE 8

Aspheric Coefficients

| Surface # | 2 | 3 | 4 | 5 | 6 |
|---|---|---|---|---|---|
| k = | −6.4102E+00 | −4.6832E+00 | −4.7252E+01 | −1.0000E+00 | −2.8995E+01 |
| A4 = | 4.4915E−01 | 2.6022E−02 | 7.4824E−02 | 2.6138E−01 | −4.3682E−01 |
| A6 = | −5.6872E−01 | 1.0934E−01 | 2.3222E−01 | −3.5504E−01 | −5.5015E−01 |
| A8 = | 5.6063E−01 | −6.9383E−01 | 2.6564E−01 | 1.0471E+00 | 9.6642E−01 |
| A10 = | −3.4370E−01 | 1.5840E+00 | −3.4141E+00 | −2.4791E+00 | −1.2146E+00 |
| A12 = | 3.5163E−01 | −2.6985E+00 | 7.5081E+00 | 2.0976E+00 | 1.3542E−01 |
| A14 = | −9.7091E−01 | 2.2291E+00 | −4.2343E+00 | 5.6198E−01 | |

| Surface # | 7 | 8 | 9 | 10 | 11 |
|---|---|---|---|---|---|
| k = | −5.0000E+01 | 1.9317E+00 | −3.4552E+00 | −3.8973E+01 | −1.1641E+01 |
| A4 = | −2.6591E−01 | 1.0005E−02 | −2.4376E−01 | −6.9985E−02 | −1.0254E−01 |
| A6 = | −2.1296E−01 | 2.2006E−01 | 3.8803E−01 | −4.5645E−02 | 3.9069E−02 |
| A8 = | 4.4364E−01 | −8.1525E−01 | −4.3342E−01 | 4.3357E−02 | −1.9520E−02 |
| A10 = | −2.4201E−01 | 1.4760E+00 | 3.2895E−01 | −5.0965E−03 | 7.2680E−03 |
| A12 = | 3.0476E−01 | −1.1348E+00 | −1.1467E−01 | −1.9067E−03 | −1.6186E−03 |
| A14 = | | 3.2463E−01 | 9.7540E−03 | 3.6270E−04 | 1.5818E−04 |

In the optical image system according to the 4th embodiment, the definitions of f, Fno, HFOV, VPE1, VPE2, V5, αPE1, PE2, CTPE1, CTPE2, CT2, CT3, CT4, CT5, R10 R4, R7, R8, f4, f5, Yc52 and Td are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 3.28 | CTPE2 (mm) | 0.100 |
| Fno | 2.45 | (CT2 + CT3)/(CT4 + CT5) | 0.51 |
| HFOV (deg.) | 34.3 | R10/f | 0.38 |
| $e^{(VPE1/V5)}$ | 3.15 | f/R4 | −0.03 |
| $e^{(VPE2/V5)}$ | 2.76 | (R7 − R8)/(R7 + R8) | 0.50 |
| αPE1(1/° C.) | $0.76 \times 10^{-5}$ | f/f4 | 1.91 |
| αPE2(1/° C.) | $6.10 \times 10^{-5}$ | |f/f4| + |f/f5| | 4.08 |
| CTPE1 (mm) | 0.200 | Yc52/Td | 0.36 |

5th Embodiment

Figure 9:
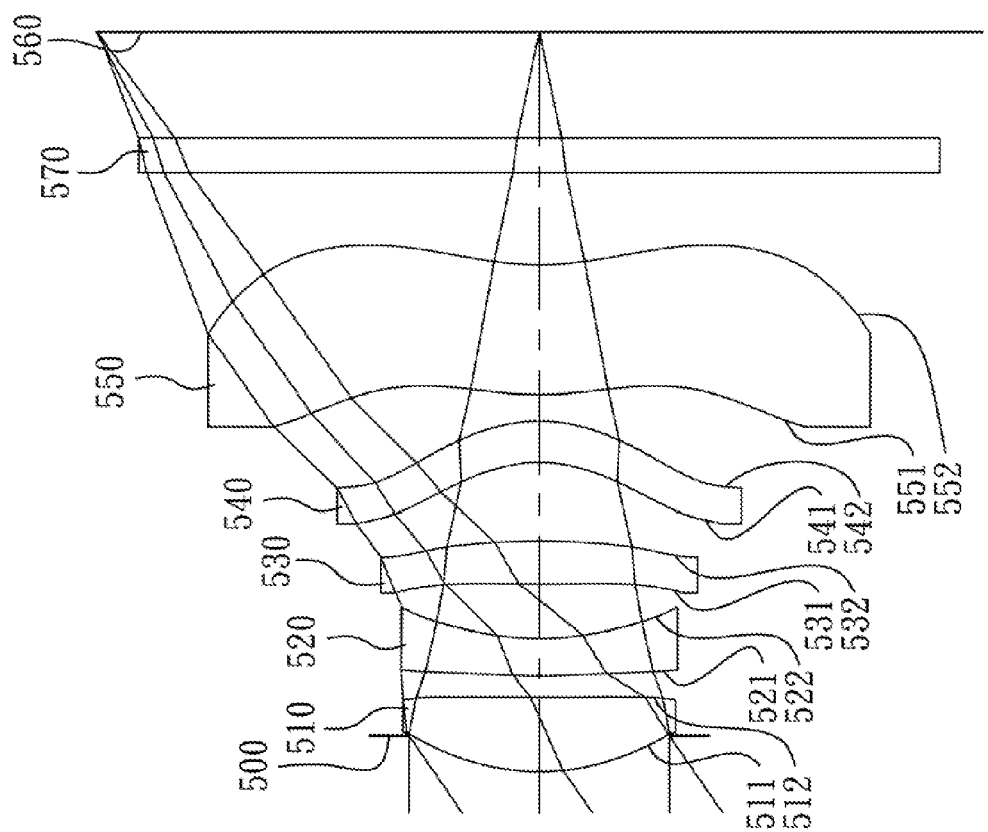
FIG. 9 is a schematic view of an optical image system according to the 5th embodiment of the present disclosure.
Figure 10:
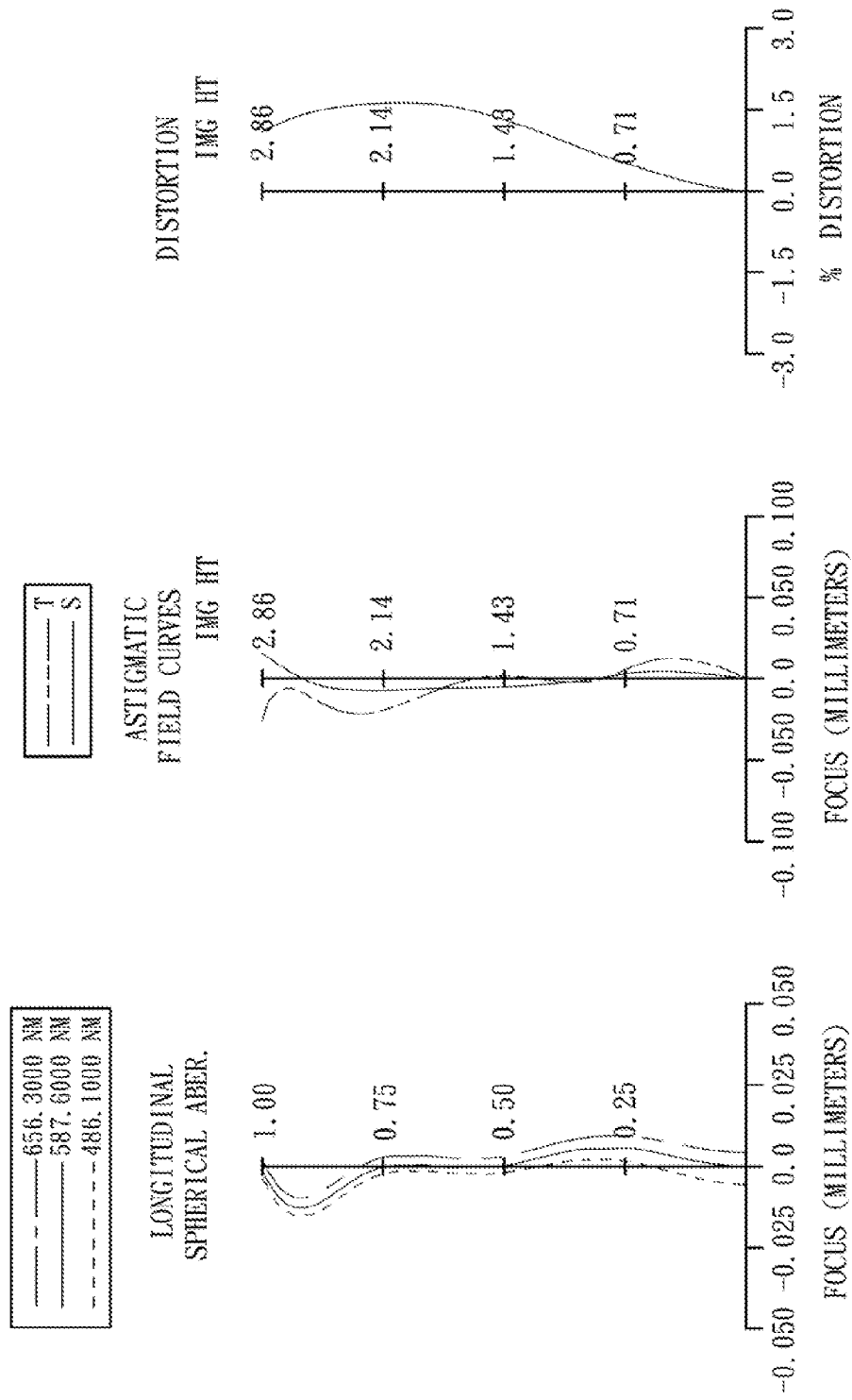
FIG. 10 shows spherical aberration curves, astigmatic field curves and a distortion curve of the optical image system according to the 5th embodiment.

FIG. 9 is a schematic view of an optical image system according to the 5th embodiment of the present disclosure. FIG. 10 shows spherical aberration curves, astigmatic field curves and a distortion curve of the optical image system according to the 5th embodiment. In FIG. 9, the optical image system includes, in order from an object side to an image side, an aperture stop 500, the first lens element 510, the second lens element 520, the third lens element 530, the fourth lens element 540, the fifth lens element 550, a flat element 570 and an image plane 560. The first, second, third, fourth, and fifth lens elements 510, 520, 530, 540, 550 are all made of plastic material.

The first lens element 510 with positive refractive power has a convex object-side surface 511 and a concave image-side surface 512. The object-side surface 511 and the image-side surface 512 of the first lens element 510 are aspheric, The second lens element 520 with negative refractive power has a convex object-side surface 521 and a concave image-side surface 522. The object-side surface 521 and the image-side surface 522 of the second lens element 520 are aspheric.

The third lens element 530 with positive refractive power has a convex object-side surface 531 and a convex image-side surface 532. The object-side surface 531 and the image-side surface 532 of the third lens element 530 are aspheric.

The fourth lens element 540 with negative refractive power has a concave object-side surface 541 and a convex image-side surface 542. The object-side surface 541 and the mage-side surface 542 of the fourth lens element 540 are aspheric.

The fifth lens element 550 with negative refractive power has a convex object-side surface 551 and a concave image-side surface 552. The object-side surface 551 and the image-side surface 552 of the fifth lens element 550 are aspheric, and the fifth lens element 550 has inflection points on the image-side surface 552 thereof.

The flat element 570 is located between the fifth lens element 550 and the image plane 560, wherein the flat element 570 is made of plastic material, and will not affect the focal length of the optical image system.

The detailed optical data of the 5th embodiment are shown in Table 9 and the aspheric surface data are shown in Table 10 below

TABLE 9

5th Embodiment
f = 4.13 mm, Fno = 2.46, HFOV = 34.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.230 | | | | |
| 2 | Lens 1 | 1.525 | (ASP) | 0.479 | Plastic | 1.544 | 55.9 | 3.04 |
| 3 | | 17.179 | (ASP) | 0.139 | | | | |
| 4 | Lens 2 | 4.309 | (ASP) | 0.240 | Plastic | 1.640 | 23.3 | −4.74 |
| 5 | | 1.740 | (ASP) | 0.352 | | | | |
| 6 | Lens 3 | 12.993 | (ASP) | 0.277 | Plastic | 1.544 | 55.9 | 7.01 |
| 7 | | −5.355 | (ASP) | 0.509 | | | | |
| 8 | Lens 4 | −0.826 | (ASP) | 0.266 | Plastic | 1.640 | 23.3 | −18.62 |
| 9 | | −0.999 | (ASP) | 0.169 | | | | |
| 10 | Lens 5 | 2.090 | (ASP) | 0.835 | Plastic | 1.544 | 55.9 | −151.33 |
| 11 | | 1.752 | (ASP) | 0.600 | | | | |
| 12 | Flat element | Plano | | 0.220 | Plastic | 1.544 | 55.9 | — |
| 13 | | Plano | | 0.687 | | | | |
| 14 | Image | Plano | | — | | | | |

Note:
Reference wavelength (d-line) is 587.6 nm.

TABLE 10

Aspheric Coefficients

| Surface # | 2 | 3 | 4 | 5 | 6 |
|---|---|---|---|---|---|
| k = | −9.1058E−02 | 1.4381E+01 | −4.8871E+01 | −6.0106E+00 | 1.9428E+01 |
| A4 = | 1.9079E−03 | −1.0607E−01 | −2.4357E−01 | −1.4544E−01 | −1.0990E−01 |
| A6 = | 1.5755E−02 | 1.9024E−01 | 5.3769E−01 | 4.3263E−01 | −1.3362E−01 |
| A8 = | −1.1767E−01 | −2.0399E−01 | −5.2233E−01 | −3.6373E−01 | 2.2398E−01 |
| A10 = | 1.9674E−01 | 4.9501E−02 | 1.4606E−01 | 8.4551E−02 | −6.4517E−02 |

TABLE 10-continued

| Aspheric Coefficients | | | | | |
|---|---|---|---|---|---|
| A12 = | −1.2138E−01 | −2.8828E−02 | 1.5262E−02 | −3.6294E−02 | −2.4669E−01 |
| A14 = | −3.9545E−02 | 6.2806E−03 | 6.3778E−02 | 1.2039E−01 | 3.9097E−01 |
| A16 = | | | | | −1.8317E−01 |

| Surface # | 7 | 8 | 9 | 10 | 11 |
|---|---|---|---|---|---|
| k = | −1.0000E+02 | −3.2099E+00 | −7.2663E−01 | −1.9554E+01 | −1.0359E+01 |
| A4 = | −8.6383E−02 | 6.5750E−02 | 1.9339E−01 | −1.5214E−01 | −8.1185E−02 |
| A6 = | −4.8935E−02 | −3.1312E−01 | −1.3575E−01 | 5.0078E−02 | 2.4127E−02 |
| A8 = | 5.4702E−02 | 4.6998E−01 | 7.4255E−02 | −1.2689E−02 | −7.7469E−03 |
| A10 = | 4.6250E−02 | −1.8426E−01 | 6.5124E−02 | 2.1565E−03 | 1.6357E−03 |
| A12 = | 1.5744E−02 | −5.2479E−03 | −1.7892E−02 | 5.9022E−04 | −2.0816E−04 |
| A14 = | −2.6607E−02 | 2.4022E−03 | −2.7660E−02 | −2.4697E−04 | 1.0190E−05 |
| A16 = | | 2.3525E−03 | 9.7017E−03 | 1.7308E−05 | |

In the optical image system according to the 5th embodiment, the definitions of f, Fno, HFOV, VPE1, VPE2, V5, αPE1, αPE2, CTPE1, CTPE2, CT2, CT3, CT4, CT5, R10, R4, R7, R6, f4, f5, Yc52 and Td are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 4.13 | R10/f | 0.42 |
| Fno | 2.46 | f/R4 | 2.37 |
| HFOV (deg.) | 34.4 | (R7 − R8)/(R7 + R8) | −0.09 |
| $e^{(VPE/V5)}$ | 2.72 | f/f4 | −0.22 |
| αPE (1/° C.) | $6.00 \times 10^{-5}$ | $|f/f4| + |f/f5|$ | 0.25 |
| CTPE (mm) | 0.220 | Yc52/Td | 0.34 |
| (CT2 + CT3)/(CT4 + CT5) | 0.47 | | |

6th Embodiment

Figure 11:
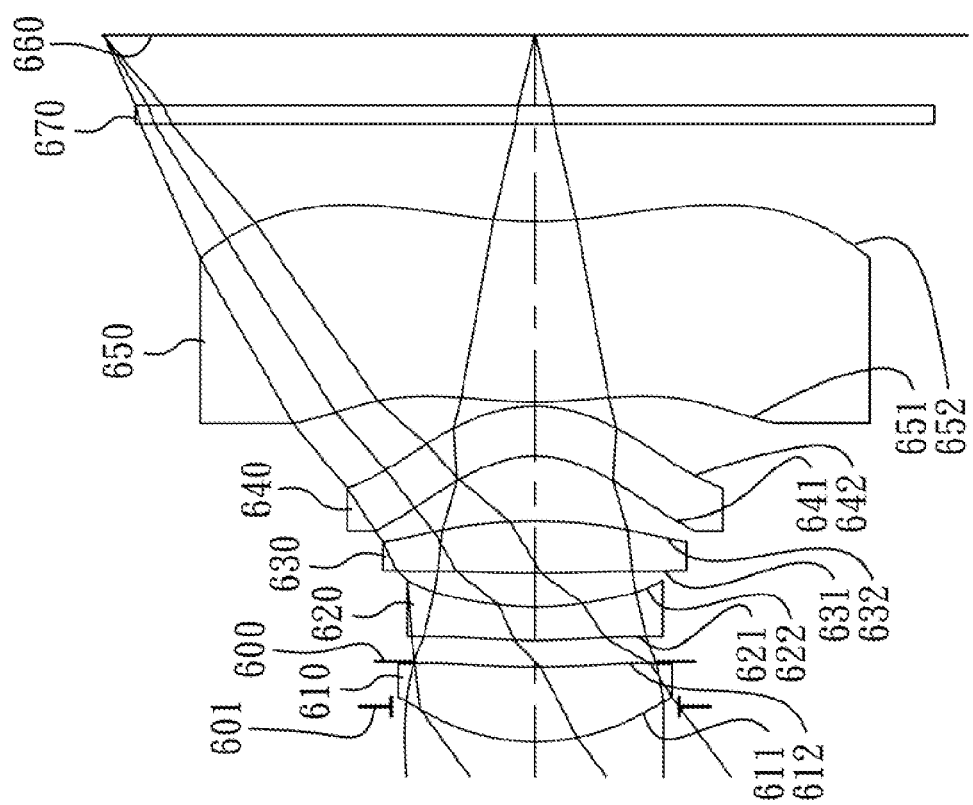
FIG. 11 is a schematic view of an optical image system according to the 6th embodiment of the present disclosure.
Figure 12:
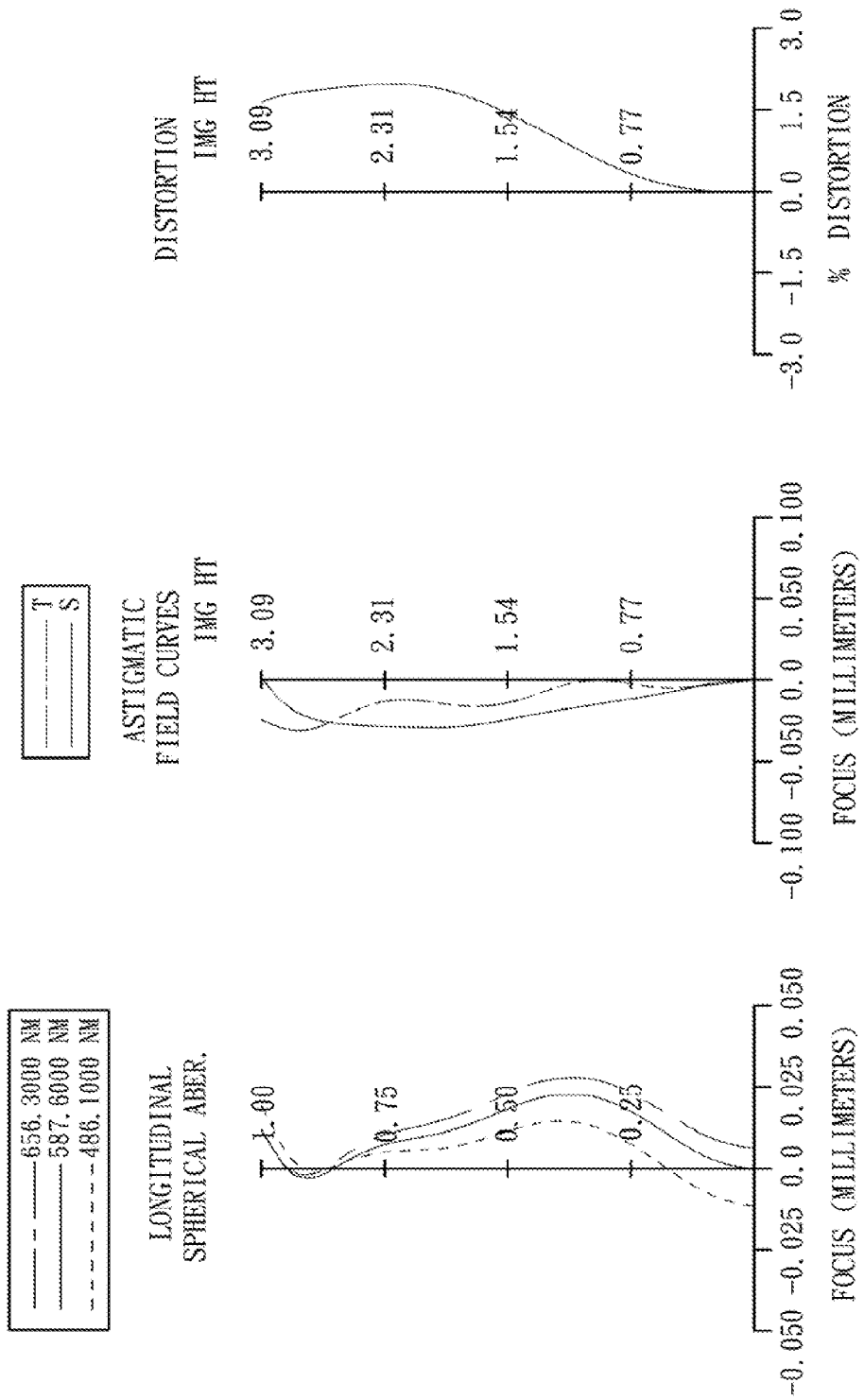
FIG. 12 shows spherical aberration curves, astigmatic field curves and a distortion curve of the optical image system according to the 6th embodiment.

FIG. 11 is a schematic view of an optical image system according to the 6th embodiment of the present disclosure. FIG. 12 shows spherical aberration curves, astigmatic field curves and a distortion curve of the optical image system according to the 6th embodiment. In FIG. 11, the optical image system includes, in order from an object side to an image side, a stop 601, the first lens element 610, an aperture stop 600, the second lens element 620, the third lens element 630, the fourth lens element 640, the fifth lens element 650, a flat element 670 and an image plane 660. The first, second, third, fourth, and fifth lens elements 610, 620, 630, 640, 650 are all made of plastic material.

The first lens element 610 with positive refractive power has a convex object-side surface 611 and a concave image-side surface 612. The object-side surface 611 and the image-side surface 612 of the first lens element 610 are aspheric.

The second lens element 620 with negative refractive power has a convex object-side surface 621 and a concave image-side surface 622. The object-side surface 621 and the image-side surface 622 of the second lens element 620 are aspheric.

The third lens element 630 with positive refractive power has a convex object-side surface 631 and a convex image-side surface 632. The object-side surface 631 and the image-side surface 632 of the third lens element 630 are aspheric.

The fourth lens element 640 with negative refractive power has a concave object-side surface 641 and a convex image-side surface 642. The object-side surface 641 and the image-side surface 642 of the fourth lens element 640 are aspheric The fifth lens element 650 with positive refractive power has a convex object-side surface 651 and a concave image-side surface 652. The object-side surface 651 and the image-side surface 652 of the fifth lens element 650 are aspheric, and the fifth lens element 650 has inflection points on the image-side surface 652 thereof.

The flat element 670 is located between the fifth lens element 650 and the image plane 660, wherein the flat element 670 is made of plastic material, and will not affect the focal length of the optical image system.

The detailed optical data of the 6th embodiment are shown in Table 11 and the aspheric surface data are shown in Table 12 below.

TABLE 11

6th Embodiment
f = 4.09 mm, Fno = 2.22, HFOV = 36.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Stop | Plano | −0.250 | | | | |
| 2 | Lens 1 | 1.553 (ASP) | 0.533 | Plastic | 1.544 | 55.9 | 3.78 |
| 3 | | 5.570 (ASP) | 0.042 | | | | |
| 4 | Ape. Stop | Plano | 0.146 | | | | |
| 5 | Lens 2 | 3.892 (ASP) | 0.240 | Plastic | 1.640 | 23.3 | −6.67 |
| 6 | | 1.987 (ASP) | 0.244 | | | | |
| 7 | Lens 3 | 7.860 (ASP) | 0.373 | Plastic | 1.544 | 55.9 | 4.71 |
| 8 | | −3.734 (ASP) | 0.465 | | | | |
| 9 | Lens 4 | −0.751 (ASP) | 0.358 | Plastic | 1.640 | 23.3 | −9.57 |
| 10 | | −1.016 (ASP) | 0.030 | | | | |
| 11 | Lens 5 | 3.008 (ASP) | 1.287 | Plastic | 1.544 | 55.9 | 99.09 |
| 12 | | 2.706 (ASP) | 0.700 | | | | |

TABLE 11-continued

6th Embodiment
f = 4.09 mm, Fno = 2.22, HFOV = 36.6 deg.

| Surface # | | Curvature Radius | Thickness | Material | Index | Abbe # | Focal length |
|---|---|---|---|---|---|---|---|
| 13 | Flat element | Plano | 0.130 | Plastic | 1.514 | 56.8 | — |
| 14 | | Plano | 0.508 | | | | |
| 15 | Image | Plano | — | | | | |

Note:
Reference wavelength (d-line) is 587.6 nm.
Effective Radius Surface 1 is 1.03 mm.

TABLE 12

Aspheric Coefficients

| Surface # | 2 | 3 | 5 | 6 | 7 |
|---|---|---|---|---|---|
| k = | −1.2183E−01 | −1.1025E+01 | −6.8405E+01 | −1.4253E+01 | −4.7000E+01 |
| A4 = | −6.4557E−03 | −7.1249E−02 | −1.2595E−01 | −1.8872E−02 | −6.8018E−02 |
| A6 = | 3.5778E−02 | 4.9924E−02 | 1.0469E−01 | 1.0205E−01 | 6.9672E−03 |
| A8 = | −4.6616E−02 | −4.8334E−02 | 4.6236E−03 | −2.9687E−02 | 2.5053E−02 |
| A10 = | −5.1037E−02 | −3.6081E−02 | −5.8954E−02 | 4.5465E−02 | −1.4863E−02 |
| A12 = | 1.3572E−01 | 2.8110E−02 | 4.6733E−03 | −4.2518E−04 | −1.6575E−02 |
| A14 = | −9.7093E−02 | −1.5987E−02 | 2.4040E−02 | 1.0763E−04 | 5.3829E−02 |
| A16 = | | | | | −2.1593E−02 |

| Surface # | 8 | 9 | 10 | 11 | 12 |
|---|---|---|---|---|---|
| k = | −4.0528E−01 | −2.5848E+00 | −7.7382E−01 | −1.8119E+01 | −1.4230E+01 |
| A4 = | −2.5582E−02 | −5.3307E−02 | 1.1541E−01 | −1.5978E−01 | −4.0862E−02 |
| A6 = | −2.3200E−03 | −4.5348E−02 | −4.0161E−02 | 1.2007E−01 | 1.1898E−02 |
| A8 = | 1.4472E−02 | 1.3597E−01 | 2.4419E−02 | −8.7675E−02 | −4.3388E−03 |
| A10 = | 3.2228E−02 | −3.1538E−02 | 1.0052E−02 | 4.0336E−02 | 1.0141E−03 |
| A12 = | −1.0640E−02 | −7.1184E−03 | −2.1770E−03 | −9.6441E−03 | −1.4545E−04 |
| A14 = | −6.4991E−03 | −4.7128E−03 | −1.7049E−03 | 1.1013E−03 | 1.1855E−05 |
| A16 = | | −3.7336E−04 | −1.4577E−05 | −4.7668E−05 | −4.1668E−07 |

In the optical image system according to the 6th embodiment, the definitions of f, Fno, HFOV, VPE, V5, αPE, CTPE, CT2, CT3, CT4, CT5, R10, R4, R7, R8 f4, f5, Yc52 and Td are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 4.09 | R10/f | 0.66 |
| Fno | 2.22 | f/R4 | 2.06 |
| HFOV (deg.) | 36.6 | (R7 − R8)/(R7 + R8) | −0.15 |
| $e^{(VPE/V5)}$ | 2.76 | f/f4 | −0.43 |
| αPE (1/° C.) | 6.10 × 10$^{-5}$ | |f/f4| + |f/f5| | 0.47 |
| CTPE (mm) | 0.130 | Yc52/Td | 0.35 |
| (CT2 + CT3)/(CT4 + CT5) | 0.37 | | |

7th Embodiment

Figure 13:
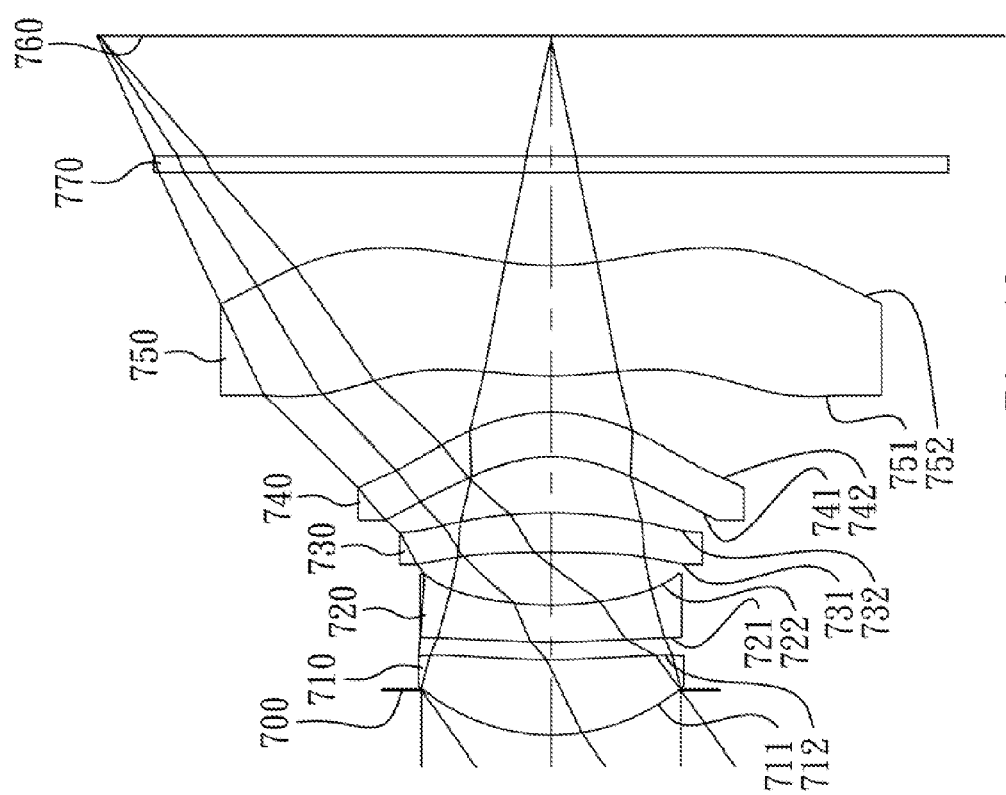
FIG. 13 is a schematic view of an optical image system according to the 7th embodiment of the present disclosure.
Figure 14:
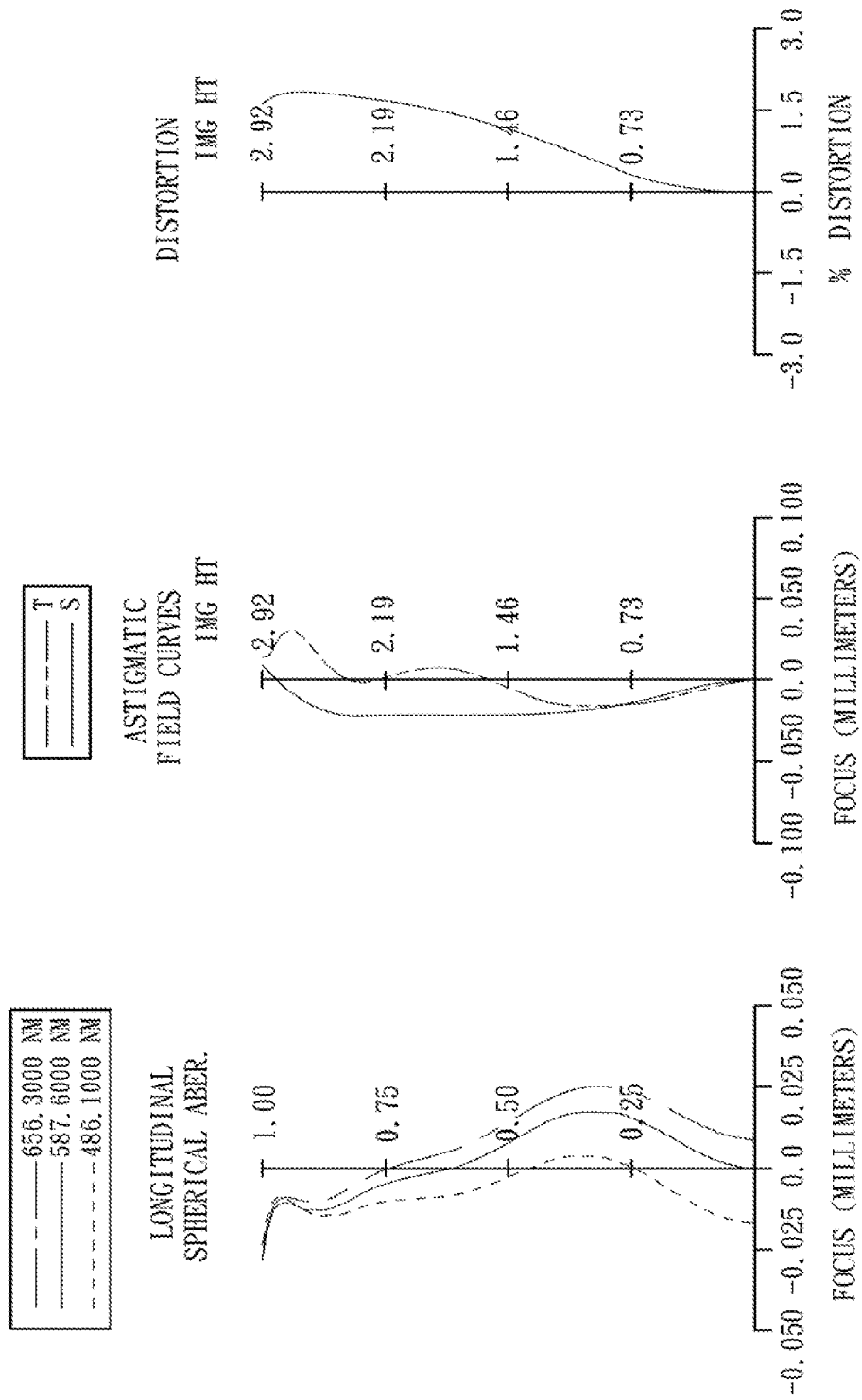
FIG. 14 shows spherical aberration curves, astigmatic field curves and a distortion curve of the optical image system according to the 7th embodiment.

FIG. 13 is a schematic view of an optical image system according to the 7th embodiment of the present disclosure. FIG. 14 shows spherical aberration curves, astigmatic field curves and a distortion curve of the optical image system according to the 7th embodiment. In FIG. 13, the optical image system includes, in order from an object side to an image side, an aperture stop 700, the first lens element 710, the second lens element 720, the third lens element 730, the fourth lens element 740, the fifth lens element 750, a flat element 770 and an image plane 760. The first, second, third, fourth, and fifth lens elements 710, 720, 730, 740, 750 are all made of plastic material.

The first lens element 710 with positive refractive power has a convex object-side surface 711 and a concave image-side surface 712. The object-side surface 711 and the image-side surface 712 of the first lens element 710 are aspheric.

The second lens element 720 with negative refractive power has a convex object-side surface 721 and a concave image-side surface 722. The object-side surface 721 and the image-side surface 722 of the second lens element 720 are aspheric.

The third lens element 730 with positive refractive power has a concave object side surface 731 and a convex image-side surface 732. The object-side surface 731 and the image-side surface 732 of the third lens element 730 are aspheric.

The fourth lens element 740 with negative refractive power has a concave object-side surface 741 and a convex image-side surface 742. The object-side surface 741 and the image-side surface 742 of the fourth lens element 740 are aspheric.

The fifth lens element 750 with positive refractive power has a convex object-side surface 751 and a concave image-side surface 752. The object-side surface 751 and the image-side surface 752 of the fifth lens element 750 are aspheric, and the fifth lens element 750 has inflection points on the image-side surface 752 thereof.

The flat element 770 is located between the fifth lens element 750 and the image plane 760, wherein the flat element 770 is made of plastic material, and will not affect the focal length of the optical image system.

The detailed optical data of the 7th embodiment are shown in Table 13 and the aspheric surface data are shown in Table 14 below.

TABLE 13

7th Embodiment
f = 4.08 mm, Fno = 2.43, HFOV = 35.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.296 | | | | |
| 2 | Lens 1 | 1.299 (ASP) | 0.492 | Plastic | 1.544 | 55.9 | 3.13 |
| 3 | | 4.754 (ASP) | 0.113 | | | | |
| 4 | Lens 2 | 4.043 (ASP) | 0.240 | Plastic | 1.640 | 23.3 | −6.31 |
| 5 | | 1.973 (ASP) | 0.338 | | | | |
| 6 | Lens 3 | −15.370 (ASP) | 0.260 | Plastic | 1.544 | 55.9 | 7.29 |
| 7 | | −3.172 (ASP) | 0.363 | | | | |
| 8 | Lens 4 | −0.897 (ASP) | 0.286 | Plastic | 1.640 | 23.3 | −19.93 |
| 9 | | −1.085 (ASP) | 0.238 | | | | |
| 10 | Lens 5 | 2.299 (ASP) | 0.714 | Plastic | 1.544 | 55.9 | −22.04 |
| 11 | | 1.718 (ASP) | 0.600 | | | | |
| 12 | Flat element | Plano | 0.110 | Plastic | 1.514 | 56.8 | — |
| 13 | | Plano | 0.779 | | | | |
| 14 | Image | Plano | — | | | | |

Note:
Reference wavelength (d-line) is 587.6 nm.

TABLE 14

Aspheric Coefficients

| Surface # | 2 | 3 | 4 | 5 | 6 |
|---|---|---|---|---|---|
| k = | −6.4331E−02 | −3.6844E+01 | −9.0000E+01 | −4.9698E+00 | −9.0000E+01 |
| A4 = | −2.3307E−04 | −1.0653E−01 | −1.6814E−01 | −1.2529E−01 | −1.4071E−01 |
| A6 = | 5.3852E−02 | 1.3070E−01 | 2.0703E−01 | 4.2523E−01 | −1.3340E−01 |
| A8 = | −9.5166E−02 | −4.4741E−02 | 1.1905E−01 | −2.0595E−01 | 5.3180E−01 |
| A10 = | 5.8395E−03 | −8.3818E−02 | −2.4827E−01 | 1.7049E−01 | −9.3419E−01 |
| A12 = | 2.2301E−01 | 4.0676E−02 | −1.0173E−01 | −3.3968E−02 | 1.1272E+00 |
| A14 = | −2.4111E−01 | −7.5396E−02 | 1.5294E−01 | 3.9534E−02 | −1.3266E−01 |
| A16 = | | | | | −4.6883E−01 |

| Surface # | 7 | 8 | 9 | 10 | 11 |
|---|---|---|---|---|---|
| k = | 1.4111E+00 | −3.7008E+00 | −7.2570E−01 | −1.3657E+01 | −8.8144E+00 |
| A4 = | −2.6059E−02 | −5.9632E−02 | 1.1041E−01 | −2.5702E−01 | −1.2627E−01 |
| A6 = | −2.9749E−02 | −7.1283E−03 | −3.7248E−02 | 1.9146E−01 | 6.5182E−02 |
| A8 = | 4.4131E−02 | 1.5139E−01 | 4.0367E−02 | −1.4054E−01 | −3.2269E−02 |
| A10 = | 9.3714E−02 | −8.9287E−02 | 1.7983E−02 | 8.2482E−02 | 1.1687E−02 |
| A12 = | −3.8683E−03 | −1.6177E−02 | −7.4478E−03 | −2.7854E−02 | −2.7731E−03 |
| A14 = | −3.9523E−02 | 3.2551E−03 | −6.8231E−03 | 4.7940E−03 | 3.8292E−04 |
| A16 = | | 7.3415E−03 | 1.0893E−03 | −3.3006E−04 | −2.2651E−05 |

In the optical image system according to the 7th embodiment, the definitions of f, Fno, HFOV, VPE, V5, αPE, CTPE, CT2, CT3, CT4, CT5, R10 R4, R7, R8, f4, f5, Yc52 and Td are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 4.08 | R10/f | 0.42 |
| Fno | 2.43 | f/R4 | 2.07 |
| HFOV (deg.) | 35.2 | (R7 − R8)/(R7 + R8) | −0.09 |
| e$^{(VPE/V5)}$ | 2.76 | f/f4 | −0.20 |
| αPE (1/° C.) | 6.10 × 10$^{−5}$ | |f/f4| + |f/f5| | 0.39 |
| CTPE (mm) | 0.110 | Yc52/Td | 0.34 |
| (CT2 + CT3)/(CT4 + CT5) | 0.50 | | |

8th Embodiment

Figure 15:
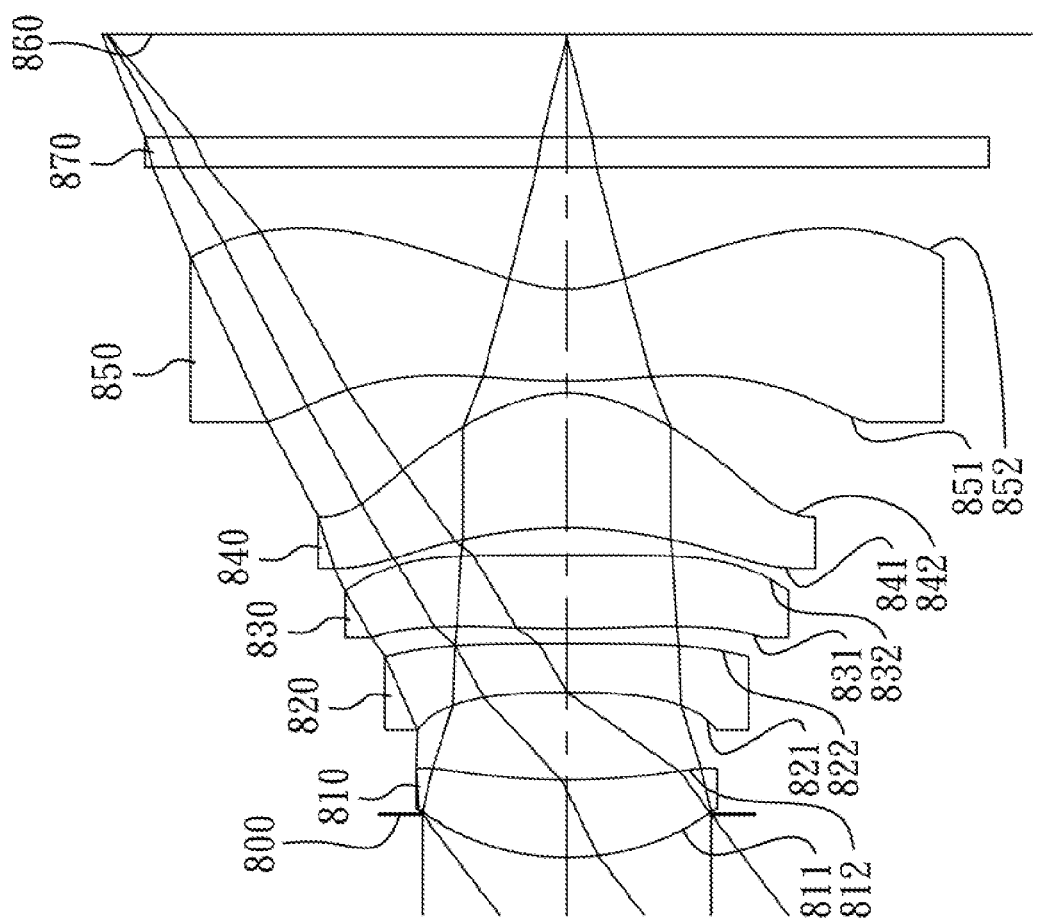
FIG. 15 is a schematic view of an optical image system according to the 8th embodiment of the present disclosure.
Figure 16:
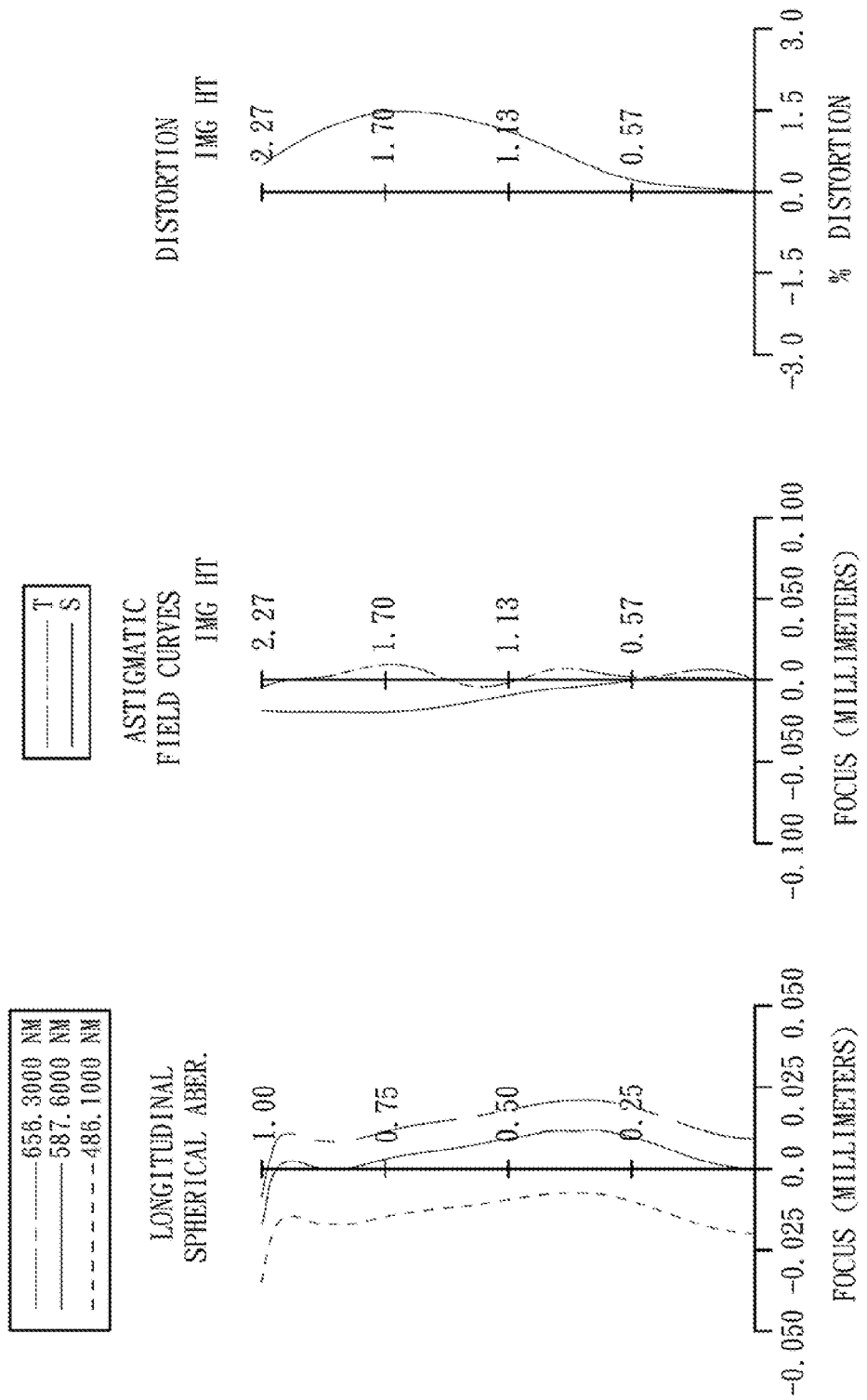
FIG. 16 shows spherical aberration curves, astigmatic field curves and a distortion curve of the optical image system according to the 8th embodiment.

FIG. 15 is a schematic view of an optical image system according to the 8th embodiment of the present disclosure. FIG. 16 shows spherical aberration curves, astigmatic field curves and a distortion curve of the optical image system according to the 8th embodiment. In FIG. 15, the optical image system includes, in order from an object side to an image side, an aperture stop 800, the first lens element 810, the second lens element 820, the third lens element 830, the fourth lens element 840, the fifth lens element 850, a flat element 870 and an image plane 860. The first, second, third, fourth, and fifth lens elements 810, 820, 830, 840, 850 are all made of plastic material.

The first lens element 810 with positive refractive power has a convex object-side surface 811 and a concave image-side surface 812. The object-side surface 811 and the image-side surface 812 of the first lens element 810 are aspheric.

The second lens element 820 with negative refractive power has a concave object-side surface 821 and a convex image-side surface 822. The object-side surface 821 and the image-side surface 822 of the second lens element 820 are aspheric.

The third lens element 830 with positive refractive power has a convex object-side surface 831 and a convex image-side surface 832. The object-side surface 831 and the image-side surface 832 of the third lens element 830 are aspheric.

The fourth lens element 840 with positive refractive power has a concave object-side surface 841 and a convex image-side surface 842. The object-side surface 841 and the image-side surface 842 of the fourth lens element 840 are aspheric.

The fifth lens element 850 with negative refractive power has a convex object-side surface 851 and a concave image-side surface 852. The object-side surface 851 and the image-side surface 852 of the fifth lens element 850 are aspheric, and the fifth lens element 850 has inflection points on the image-side surface 852 thereof.

The flat element 870 is located between the fifth lens element 850 and the image plane 860, wherein the flat element 870 is made of plastic material, and will not affect the focal length of the optical image system.

The detailed optical data of the 8th embodiment are shown in Table 15 and the aspheric surface data are shown in Table 16 below.

In the optical image system according to the 8th embodiment, the definitions of f, Fno, HFOV, VPE, V5, αPE, αPE, CT2, CT3, CT4, CT5, R10, R4, R7, R8, f4, f5, Yc52 and Td are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 2.96 | R10/f | 0.23 |
| Fno | 2.08 | f/R4 | −0.03 |
| HFOV (deg.) | 37.3 | (R7 − R8)/(R7 + R8) | 0.50 |
| $e^{(VPE/V5)}$ | 2.76 | f/f4 | 1.86 |
| αPE (1/° C.) | $6.10 \times 10^{-5}$ | $|f/f4| + |f/f5|$ | 3.60 |
| CTPE (mm) | 0.150 | Yc52/Td | 0.46 |
| (CT2 + CT3)/(CT4 + CT5) | 0.54 | | |

TABLE 15

8th Embodiment
f = 2.96 mm, Fno = 2.08, HFOV = 37.3 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.211 | | | | |
| 2 | Lens 1 | 1.298 | (ASP) | 0.381 | Plastic | 1.544 | 55.9 | 3.60 |
| 3 | | 3.465 | (ASP) | 0.434 | | | | |
| 4 | Lens 2 | −4.040 | (ASP) | 0.240 | Plastic | 1.640 | 23.3 | −6.59 |
| 5 | | −100.000 | (ASP) | 0.074 | | | | |
| 6 | Lens 3 | 6.639 | (ASP) | 0.361 | Plastic | 1.544 | 55.9 | 11.46 |
| 7 | | −100.000 | (ASP) | 0.136 | | | | |
| 8 | Lens 4 | −2.047 | (ASP) | 0.665 | Plastic | 1.544 | 55.9 | 1.59 |
| 9 | | −0.678 | (ASP) | 0.060 | | | | |
| 10 | Lens 5 | 3.132 | (ASP) | 0.454 | Plastic | 1.544 | 55.9 | −1.70 |
| 11 | | 0.677 | (ASP) | 0.600 | | | | |
| 12 | Flat element | Plano | | 0.150 | Plastic | 1.514 | 56.8 | — |
| 13 | | Plano | | 0.507 | | | | |
| 14 | Image | Plano | | — | | | | |

Note:
Reference wavelength (d-line) is 587.6 nm.

TABLE 16

Aspheric Coefficients

| Surface # | 2 | 3 | 4 | 5 | 6 |
|---|---|---|---|---|---|
| k = | −3.0713E−01 | −1.0000E+00 | 1.4937E+01 | −9.0000E+01 | −1.8218E+01 |
| A4 = | 3.4355E−02 | 2.5864E−02 | −1.2468E−01 | −1.9217E−02 | −2.3122E−02 |
| A6 = | 1.9634E−01 | −1.0823E−01 | −2.9838E−01 | −4.6937E−01 | −4.8060E−01 |
| A8 = | −7.6145E−01 | 4.1509E−01 | 2.9463E−01 | 6.8264E−01 | 2.4730E−01 |
| A10 = | 1.7548E+00 | −1.7692E+00 | −5.1852E−01 | 9.3203E−01 | 1.5134E+00 |
| A12 = | −1.6066E+00 | 3.1011E+00 | −2.6337E−01 | −2.9987E+00 | −2.3788E+00 |
| A14 = | 6.5308E−02 | −3.1287E+00 | −1.2705E+00 | 1.8795E+00 | 9.9318E−01 |

| Surface # | 7 | 8 | 9 | 10 | 11 |
|---|---|---|---|---|---|
| k = | −1.0000E+00 | −1.0000E+00 | −3.7710E+00 | −3.7173E+01 | −5.1532E+00 |
| A4 = | 4.0323E−02 | 1.4250E−01 | −3.9630E−01 | −1.3892E−01 | −1.3394E−01 |
| A6 = | −2.9118E−01 | −2.3525E−01 | 6.6278E−01 | −3.5684E−02 | 7.2069E−02 |
| A8 = | 1.5354E−01 | 1.3721E−01 | −1.0469E+00 | 1.0598E−01 | −3.0792E−02 |
| A10 = | −2.5975E−02 | 3.7421E−02 | 1.0247E+00 | −7.3712E−02 | 8.4001E−03 |
| A12 = | 3.6065E−02 | −1.2111E−02 | −4.4563E−01 | 2.4107E−02 | −1.3489E−03 |
| A14 = | −2.5735E−02 | −1.2543E−02 | 6.8468E−02 | −2.9913E−03 | 9.5791E−05 |

What is claimed is:

1. An optical image system comprising, in order from an object side to an image side:
   a first lens element with positive refractive power having a convex object-side surface;
   a second lens element with negative refractive power;
   a third lens element with refractive power, wherein an object-side surface and an image-side surface of the third lens element are aspheric;
   a fourth lens element with refractive power having a convex image-side surface, wherein an object-side surface and the image-side surface of the fourth lens element are aspheric; end
   a fifth lens element with refractive power having a concave image-side surface, wherein an object-side surface and the image-side surface of the fifth lens element are aspheric, and the fifth lens element has at least one inflection point on the image-side surface thereof;
   wherein the optical image system has a total of five lens elements with refractive power, the optical image system further comprises at least one flat element located between the fifth lens element and an image plane, a focal length of the optical image system is f, a curvature radius of the image-side surface of the fifth lens element is R10, a distance between the optical axis and the non-axial critical point on the image-side surface of the fifth lens element is Yc52, an axial distance between the object-side-surface of the first lens element and the image-side surface of the fifth lens element is Td, a linear expansion coefficient of the flat element at 20° C. is αPE, and the following relationships are satisfied:

$0 < R10/f < 1.0;$ $0.20 < Yc52/Td < 0.70;$ and $3.0 \times 10^{-5} (1/°C.) < \alpha PE < 10.0 \times 10^{-5} (1/°C.).$ 2. The optical image system of claim 1, wherein the fourth lens element has a concave object-side surface.

3. The optical image system of claim 2, wherein an Abbe number of the flat element is VPE, an Abbe number of the fifth lens element is V5, and the following relationship is satisfied:

$2.2 < e^{(VPE/V5)} < 3.0.$

4. The optical image system of claim wherein the fourth lens element has positive refractive power, nd the fifth lens element has negative refractive power.

5. The optical image system of claim 4, wherein the focal length of the optical image system is f, a focal length of the fourth lens element is f4, a focal length of the fifth lens element is f5, and the following relationship is satisfied:

$3.0 < |f/f4| + |f/f5| < 5.5.$

6. The optical image system of claim 5, wherein the focal length of the optical image system is f, a curvature radius of the image-side surface of the second lens element is R4, and the following relationship is satisfied:

$-0.5 < f/R4 \leq 0.$

7. The optical image system of claim 5, wherein the focal length of the optical image system is f, a curvature radius of the image-side surface of the second lens element is R4, and the following relationship is satisfied:

$-0.2 < f/R4 \leq 0.$

8. The optical age system of claim 2, wherein a curvature radius of the object-side surface of the fourth lens element is R7, a curvature radius of the image-side surface of the fourth lens element is R8, and the following relationship is satisfied:

$-0.4 < (R7-R8)/(R7+R8) < 0.8.$

9. The optical image system of claim 8, wherein the fourth lens element has negative refractive power.

10. The optical image system of claim 9, wherein the oc length of the optical image system is f, a focal length of the fourth lens element is f4, and the following relationship is satisfied:

$-1.0 < f/f4 < 0.$

11. The optical image system of claim 9, wherein the focal length of the optical image system is f, a focal length of the fourth lens element is f4, and the following relationship is satisfied:

$-0.55 < f/f4 < 0.$

12. The optical mage system of claim 9, wherein the linear expansion coefficient of the flat element at 20° C. is αPE, and the following relationship is satisfied:

$4.5 \times 10^{-5} (1/°C.) < \alpha PE < 10.0 \times 10^{-5} (1/°C.).$

13. The optical image system of claim 10, wherein the fifth lens element has a convex object-side surface.

14. The optical image system of claim 1, wherein a central thickness of the flat element is CTPE, and the following relationship is satisfied:

$0.05 \text{ mm} < CTPE \leq 0.13 \text{ mm}.$

15. The optical age system of claim 14, herein a central thickness of the second lens element is CT2, a central thickness of the third lens element is CT3, a central thickness of the fourth lens element is CT4, a central thickness of the fifth lens element is CT5, and the following relationship is satisfied:

$0.3 < (CT2+CT3)/(CT4+CT5) < 0.7.$

16. An optical image system comprising, in order from an object side to an image sid
    a first lens element with positive refractive power having a convex object-side surface;
    a second lens element with refractive power;
    a third lens element with refractive power, wherein an object-side surface and an image-side surface of the third lens element are aspheric;
    a fourth lens element with refractive power having a concave object-side surface and a convex image-side surface, wherein the object-side surface and the image-side surface of the fourth lens element are aspheric; and
    a fifth lens element with refractive power having a concave image-side surface, wherein an object-side surface and the image-side surface of the fifth lens element are aspheric, and the fifth lens element has at least one inflection point on the image-side surface thereof;
    wherein the optical image system has a total of five lens elements with refractive power, the optical image system further comprises at least one flat element located between the fifth lens element and an image plane, a focal length of the optical image system is f, a curvature radius of the image-side surface of the fifth lens element is R10, a distance between the optical axis and the non-axial critical point on the image-side surface of the fifth lens element is Yc52 an axial distance between the object-side surface of the first lens element and the image-side surface of the fifth lens element is Td, an Abbe number of the flat element is VPE, an Abbe number of the fifth lens element is V5, a linear expansion coefficient of the flat element at 20° C. is αPE, and the following relationships are satisfied:

$0 < R10/f < 1.0$;

$0.20 < Yc52/Td < 0.70$;

$2.2 < e^{(VPE/V5)} < 3.0$; and $3.0 \times 10^{-5} (1/° C.) < \alpha PE < 10.0 \times 10^{-5} (1/° C.$ 17. The optical image system of claim 16, wherein a central thickness of the second lens element is CT2, a central thickness of the third lens element is CT3, central thickness of the fourth lens element is CT4, a central thickness of the fifth lens element is CT5, and the following relationship is satisfied:

$0.3 < (CT2+CT3)/(CT4+CT5) < 0.7$.

18. The optical image system of claim 16, wherein the focal length of the optical image system is f, a curvature radius of the image-side surface of the second lens element is R4, and the following relationship is satisfied:

$-0.5 < f/R4 \leq 0$.

19. The optical age system of claim 16, wherein the focal length of the optical image system is f, a curvature radius of the image-side surface f the second lens element is R4, and the following relationship is satisfied:

$-0.2 < f/R4 \leq 0$.

20. The optical image system of claim 16, wherein the second lens element has negative refractive power, a central thickness of the flat element is CTPE, end the foiloring relationship is satisfied:

$0.05$ mm $< CTPE \leq 0.13$ mm.

21. The optical image system of claim 16, wherein the second lens element has negative refractive power, the focal length of the optical image system f a focal length of the fourth lens element is f4, and the following relationship iso satisfied:

$-0.55 < f/f4 < 0$.

* * * * *

UNITED STATES PATENT AND TRADEMARK OFFICE
CERTIFICATE OF CORRECTION

PATENT NO.        : 8,988,789 B2
APPLICATION NO.   : 13/652486
DATED             : March 24, 2015
INVENTOR(S)       : Hsiang-Chi Tang, Tsung-Han Tsai and Hsin-Hsuan Huang It is certified that error appears in the above-identified patent and that said Letters Patent is hereby corrected as shown below:

In the Claims (1) In column 27, line 20, Claim 1 of the issued patent reads as "a fourth lens element...are aspheric; end", but it should read as "a fourth lens element...are aspheric; and".
(2) In column 27, line 35, Claim 1 of the issued patent reads as "an axial distance between the object-side-surface of...", but it should read as "an axial distance between the object-side surface of...".
(3) In column 27, line 52, Claim 4 of the issued patent reads as "The optical image system of claim wherein...", but it should read as "The optical image system of claim 3, wherein...".
(4) In column 27, line 53, Claim 4 of the issued patent reads as ", nd the fifth lens element has negative refractive power", but it should read as ", and the fifth lens element has negative refractive power".
(5) In column 28, line 13, Claim 10 of the issued patent reads as "wherein the oc length of the optical image system is f", but it should read as "wherein the focal length of the optical image system is f".
(6) In column 28, line 36, Claim 15 of the issued patent reads as "The optical age system of claim 14", but it should read as "The optical image system of claim 14".
(7) In column 28, line 36, Claim 15 of the issued patent reads as "..., herein a central thickness...", but it should read as "..., wherein a central thickness...".
(8) In column 28, line 44, Claim 16 of the issued patent reads as "..., in order from an object side to an image sid:", but it should read as "..., in order from an object side to an image side:".
(9) In column 29, line 1, Claim 16 of the issued patent reads as "a distance between the...is Yc52 an axial...", but it should read as "a distance between the...is Yc52, an axial...".
(10) In column 29, line 18, Claim 17 of the issued patent reads as "central thickness of the fourth lens element is CT4", but it should read as "a central thickness of the fourth lens element is CT4".
(11) In column 30, line 7, Claim 19 of the issued patent reads as "a curvature radius of the image-side surface f the second lens...", but it should read as "a curvature radius of the image-side surface of the second lens...".
(12) In column 30, line 13, Claim 20 of the issued patent reads as "end the foiloring relationship is satisfied:", but it should read as "and the following relationship is satisfied:".
(13) In column 30, line 19, Claim 21 of the issued patent reads as "the focal length of the optical Signed and Sealed this
Twenty-seventh Day of October, 2015

Michelle K. Lee
*Director of the United States Patent and Trademark Office* image system f a focal length...", but it should read as "the focal length of the optical image system is f, a focal length...".

(14) In column 30, line 20, Claim 21 of the issued patent reads as "and the following relationship iso satisfied:", but it should read as "and the following relationship is satisfied:".